United States Patent
Pirch et al.

(10) Patent No.: US 12,212,964 B2
(45) Date of Patent: *Jan. 28, 2025

(54) READER COORDINATION FOR ACCESS CONTROL

(71) Applicant: ASSA ABLOY AB, Stockholm (SE)

(72) Inventors: Hans-Juergen Pirch, Gratwein Strassengel (AT); Fredrik Carl Stefan Einberg, Huddinge (SE); Tomas Lars Jonsson, Rönninge (SE); Sylvain Jacques Prevost, Austin, TX (US); Jan Steffl, Senomaty (CZ); Hans Gunnar Frank, Spånga (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,309

(22) Filed: Dec. 28, 2023

(65) Prior Publication Data

US 2024/0298179 A1 Sep. 5, 2024

Related U.S. Application Data

(63) Continuation of application No. 17/593,336, filed as application No. PCT/EP2020/058199 on Mar. 24, 2020, now Pat. No. 11,902,784.

(Continued)

(51) Int. Cl.
*H04W 12/08* (2021.01)
*G06F 12/14* (2006.01)
(Continued)

(52) U.S. Cl.
CPC ........ *H04W 12/08* (2013.01); *G06F 12/1458* (2013.01); *G06N 3/08* (2013.01);
(Continued)

(58) Field of Classification Search
CPC ................ G07C 9/00309; G07C 9/00904; H04W 12/08
See application file for complete search history.

(56) References Cited

U.S. PATENT DOCUMENTS

| 7,446,644 B2 | 11/2008 | Schaffzin et al. |
| 7,499,674 B2 | 3/2009 | Salokannel et al. |

(Continued)

FOREIGN PATENT DOCUMENTS

| AU | 2018389642 A1 | 5/2020 |
| AU | 2020247109 | 10/2021 |

(Continued)

OTHER PUBLICATIONS

"European Application Serial No. 23210850.6, Extended European Search Report mailed Apr. 3, 2024", 11 pgs.

(Continued)

*Primary Examiner* — Nabil H Syed
(74) *Attorney, Agent, or Firm* — Schwegman Lundberg & Woessner, P.A.

(57) ABSTRACT

Systems and methods for access control systems includes first and second access facilities, and first and second readers. The first reader is configured to control access through the first access facility, receive a credential using a first communication protocol from a device that stores the credential, and establish a secret with the device using the credential. The second reader is configured to control access through the second access facility. The first reader is configured to provide the secret to the second reader, and the second device is further configured to perform ranging using the secret and a second communication protocol different than the first communication protocol to identify intent information. Access through one of the first facility or the second facility is coordinated using the intent information.

20 Claims, 6 Drawing Sheets

Related U.S. Application Data

(60) Provisional application No. 62/823,341, filed on Mar. 25, 2019.

(51) Int. Cl.

| | |
|---|---|
| *G06N 3/08* | (2023.01) |
| *G06Q 10/1093* | (2023.01) |
| *G07C 9/00* | (2020.01) |
| *G07C 9/10* | (2020.01) |
| *G07C 9/21* | (2020.01) |
| *G07C 9/22* | (2020.01) |
| *G07C 9/25* | (2020.01) |
| *G07C 9/27* | (2020.01) |
| *G07C 9/28* | (2020.01) |
| *G07C 9/29* | (2020.01) |
| *H04W 4/02* | (2018.01) |
| *H04W 4/80* | (2018.01) |
| *H04W 12/06* | (2021.01) |
| *H04W 12/64* | (2021.01) |

(52) U.S. Cl.
CPC ..... *G06Q 10/1095* (2013.01); *G07C 9/00174* (2013.01); *G07C 9/00182* (2013.01); *G07C 9/00309* (2013.01); *G07C 9/00904* (2013.01); *G07C 9/10* (2020.01); *G07C 9/21* (2020.01); *G07C 9/22* (2020.01); *G07C 9/257* (2020.01); *G07C 9/27* (2020.01); *G07C 9/28* (2020.01); *G07C 9/29* (2020.01); *H04W 4/027* (2013.01); *H04W 4/80* (2018.02); *H04W 12/06* (2013.01); *H04W 12/64* (2021.01); *G07C 2009/00333* (2013.01); *G07C 2009/00357* (2013.01); *G07C 2009/00769* (2013.01); *G07C 2209/08* (2013.01); *G07C 2209/61* (2013.01); *G07C 2209/63* (2013.01)

(56) References Cited

U.S. PATENT DOCUMENTS

| | | |
|---|---|---|
| 7,597,250 B2 | 10/2009 | Finn |
| 7,756,002 B2 | 7/2010 | Batra et al. |
| 7,881,746 B2 | 2/2011 | Desai |
| 7,995,644 B2 | 8/2011 | Sahinoglu et al. |
| 8,001,055 B2 | 8/2011 | Weiss |
| 8,355,671 B2 | 1/2013 | Kramer et al. |
| 8,430,310 B1 | 4/2013 | Ho et al. |
| 8,478,360 B2 | 7/2013 | Soliman |
| 8,736,438 B1 | 5/2014 | Vasquez et al. |
| 8,913,599 B2 | 12/2014 | Gonikberg et al. |
| 9,007,173 B2 | 4/2015 | Mcintyre et al. |
| 9,058,702 B2 | 6/2015 | Chao et al. |
| 9,357,381 B2 | 5/2016 | Cho et al. |
| 9,367,978 B2 | 6/2016 | Sullivan |
| 9,408,147 B2 | 8/2016 | Polo et al. |
| 9,485,607 B2 | 11/2016 | Aarnio |
| 9,501,884 B2 | 11/2016 | Mcintyre et al. |
| 9,530,265 B2 | 12/2016 | Lee et al. |
| 9,666,005 B2 | 5/2017 | Ellis et al. |
| 9,721,404 B2 | 8/2017 | Muller |
| 9,769,627 B2 | 9/2017 | Siswick et al. |
| 9,830,443 B2 | 11/2017 | Mutz et al. |
| 9,942,849 B1 | 4/2018 | Hariharan et al. |
| 10,117,046 B2 | 10/2018 | Ledvina et al. |
| 10,152,837 B1 | 12/2018 | Mallard |
| 10,171,129 B1 | 1/2019 | Hammerschmidt et al. |
| 10,182,309 B2 | 1/2019 | Mahasenan et al. |
| 10,228,444 B2 | 3/2019 | Jonsson |
| 10,229,548 B2 | 3/2019 | Daniel-Wayman et al. |
| 10,230,522 B1 | 3/2019 | Roths et al. |
| 10,235,854 B2 | 3/2019 | Trani |
| 10,356,553 B2 | 7/2019 | Sant et al. |
| 10,486,646 B2 | 11/2019 | Ledvina et al. |
| 10,567,034 B2 | 2/2020 | Hammerschmidt et al. |
| 10,602,556 B2 | 3/2020 | Foster et al. |
| 10,652,925 B2 | 5/2020 | Naguib et al. |
| 10,660,037 B2 | 5/2020 | Hariharan et al. |
| 10,728,244 B2 | 7/2020 | Trani et al. |
| 10,759,389 B2 | 9/2020 | Ledvina et al. |
| 10,819,029 B2 | 10/2020 | Amiri et al. |
| 11,100,734 B2 | 8/2021 | Ahn et al. |
| 11,164,411 B2 | 11/2021 | Kuenzi et al. |
| 11,237,243 B2 | 2/2022 | Jonsson et al. |
| 11,295,563 B2 | 4/2022 | Kuenzi et al. |
| 11,405,784 B2 | 8/2022 | Pirch et al. |
| 11,765,588 B2 | 9/2023 | Pirch et al. |
| 11,770,708 B2 | 9/2023 | Pirch et al. |
| 11,825,292 B2 | 11/2023 | Pirch et al. |
| 11,887,416 B2 | 1/2024 | Hoyer et al. |
| 11,900,750 B2 | 2/2024 | Pirch et al. |
| 11,902,784 B2 | 2/2024 | Pirch et al. |
| 11,928,906 B2 | 3/2024 | Pirch et al. |
| 11,955,723 B2 | 4/2024 | Pirch |
| 12,022,288 B2 | 6/2024 | Pirch et al. |
| 12,133,077 B2 | 10/2024 | Pirch et al. |
| 2003/0204742 A1 | 10/2003 | Gupta et al. |
| 2003/0232620 A1 | 12/2003 | Runkle et al. |
| 2004/0250074 A1 | 12/2004 | Kilian-Kehr |
| 2004/0266494 A1 | 12/2004 | Ruuska et al. |
| 2005/0058107 A1 | 3/2005 | Salokannel et al. |
| 2007/0149123 A1 | 6/2007 | Palin |
| 2007/0149124 A1 | 6/2007 | Onozawa |
| 2007/0288995 A1 | 12/2007 | Terada et al. |
| 2008/0259846 A1 | 10/2008 | Gonikberg et al. |
| 2008/0259896 A1 | 10/2008 | Sahinoglu et al. |
| 2009/0147803 A1 | 6/2009 | Takayama |
| 2010/0034375 A1 | 2/2010 | Davis et al. |
| 2011/0187493 A1 | 8/2011 | Elfstroem et al. |
| 2012/0266221 A1 | 10/2012 | Castelluccia et al. |
| 2013/0217332 A1 | 8/2013 | Altman et al. |
| 2013/0225080 A1 | 8/2013 | Doss et al. |
| 2013/0237148 A1 | 9/2013 | McCann et al. |
| 2013/0287211 A1 | 10/2013 | Rhelimi |
| 2014/0070003 A1 | 3/2014 | Radicella |
| 2014/0229385 A1 | 8/2014 | Neafsey |
| 2014/0298398 A1 | 10/2014 | Neely |
| 2014/0342667 A1 | 11/2014 | Aarnio |
| 2014/0355582 A1 | 12/2014 | Kamath et al. |
| 2015/0029010 A1 | 1/2015 | Wisnia |
| 2015/0200706 A1 | 7/2015 | Bottazzi et al. |
| 2015/0200925 A1 | 7/2015 | Lagerstedt et al. |
| 2015/0310681 A1 | 10/2015 | Avery et al. |
| 2015/0332532 A1 | 11/2015 | Lee et al. |
| 2016/0014605 A1 | 1/2016 | Robinton et al. |
| 2016/0055692 A1 | 2/2016 | Trani |
| 2016/0086406 A1 | 3/2016 | Baumgarte |
| 2016/0147988 A1 | 5/2016 | Mutz et al. |
| 2016/0229689 A1 | 8/2016 | Kaanta et al. |
| 2016/0234008 A1 | 8/2016 | Hekstra et al. |
| 2016/0241559 A1 | 8/2016 | Trani et al. |
| 2016/0241999 A1 | 8/2016 | Chin et al. |
| 2016/0248748 A1 | 8/2016 | Caterino et al. |
| 2016/0248782 A1 | 8/2016 | Troesch |
| 2016/0267760 A1 | 9/2016 | Trani |
| 2016/0278006 A1 | 9/2016 | Lee et al. |
| 2016/0316500 A1 | 10/2016 | Aliyar |
| 2016/0353233 A1 | 12/2016 | Yong et al. |
| 2016/0358394 A1 | 12/2016 | Konicek et al. |
| 2016/0360341 A1 | 12/2016 | Srivatsa et al. |
| 2017/0004665 A1 | 1/2017 | Chang et al. |
| 2017/0019765 A1 | 1/2017 | Hoyer et al. |
| 2017/0053467 A1 | 2/2017 | Meganck et al. |
| 2017/0070919 A1 | 3/2017 | Verger et al. |
| 2017/0074000 A1 | 3/2017 | Banvait |
| 2017/0151918 A1 | 6/2017 | Boesen |
| 2017/0153636 A1 | 6/2017 | Boesen |
| 2017/0158202 A1 | 6/2017 | Yang |
| 2017/0228953 A1 | 8/2017 | Lupovici |
| 2017/0232930 A1 | 8/2017 | Murar et al. |
| 2017/0236346 A1 | 8/2017 | Murar et al. |
| 2017/0236351 A1 | 8/2017 | Menard et al. |
| 2017/0301166 A1 | 10/2017 | Earles et al. |

(56) References Cited

U.S. PATENT DOCUMENTS

| | | |
|---|---|---|
| 2017/0303084 A1 | 10/2017 | Brückner |
| 2017/0330226 A1 | 11/2017 | Kuenzi et al. |
| 2017/0359689 A1 | 12/2017 | Chhabra et al. |
| 2018/0081025 A1 | 3/2018 | Jonsson et al. |
| 2018/0103030 A1 | 4/2018 | Einberg et al. |
| 2018/0124593 A1 | 5/2018 | Ricciato et al. |
| 2018/0144563 A1 | 5/2018 | Reymann |
| 2018/0162321 A1 | 6/2018 | Spiess |
| 2018/0225898 A1 | 8/2018 | Kirkland et al. |
| 2018/0234797 A1 | 8/2018 | Ledvina et al. |
| 2018/0310159 A1 | 10/2018 | Katz et al. |
| 2018/0315262 A1 | 11/2018 | Love et al. |
| 2018/0365400 A1 | 12/2018 | Lopez-Hinojosa et al. |
| 2019/0051072 A1 | 2/2019 | Okada |
| 2019/0052314 A1 | 2/2019 | Caruana |
| 2019/0061686 A1 | 2/2019 | Neuhoff et al. |
| 2019/0073468 A1 | 3/2019 | Kazerani et al. |
| 2019/0073846 A1 | 3/2019 | Kamkar et al. |
| 2019/0097317 A1 | 3/2019 | Di Nallo et al. |
| 2019/0098499 A1 | 3/2019 | Lerch et al. |
| 2019/0116619 A1 | 4/2019 | Hauck et al. |
| 2019/0135229 A1 | 5/2019 | Ledvina et al. |
| 2019/0266822 A1 | 8/2019 | Ruggieri et al. |
| 2020/0053689 A1 | 2/2020 | McQueen et al. |
| 2020/0106877 A1 | 4/2020 | Ledvina et al. |
| 2020/0150261 A1 | 5/2020 | Naguib et al. |
| 2020/0168017 A1 | 5/2020 | Prostko et al. |
| 2020/0238952 A1 | 7/2020 | Lindsay et al. |
| 2020/0259522 A1 | 8/2020 | Hammerschmidt et al. |
| 2020/0259896 A1 | 8/2020 | Sachs et al. |
| 2020/0314651 A1 | 10/2020 | Pirch et al. |
| 2020/0320188 A1 | 10/2020 | Graff et al. |
| 2020/0349785 A1 | 11/2020 | Kuenzi et al. |
| 2020/0351781 A1 | 11/2020 | Hariharan et al. |
| 2021/0142600 A1 | 5/2021 | Tiwari et al. |
| 2021/0352608 A1 | 11/2021 | Chun et al. |
| 2021/0383624 A1 | 12/2021 | Hoyer et al. |
| 2022/0157106 A1 | 5/2022 | Pirch et al. |
| 2022/0172529 A1 | 6/2022 | Pirch et al. |
| 2022/0172536 A1 | 6/2022 | Pirch et al. |
| 2022/0189224 A1 | 6/2022 | Pirch et al. |
| 2022/0189228 A1 | 6/2022 | Pirch et al. |
| 2022/0189229 A1 | 6/2022 | Pirch et al. |
| 2022/0191700 A1 | 6/2022 | Jung et al. |
| 2022/0377555 A1 | 11/2022 | Pirch et al. |
| 2023/0388799 A1 | 11/2023 | Pirch et al. |
| 2024/0096157 A1 | 3/2024 | Pirch et al. |
| 2024/0161558 A1 | 5/2024 | Hoyer et al. |
| 2024/0251245 A1 | 7/2024 | Pirch et al. |

FOREIGN PATENT DOCUMENTS

| | | |
|---|---|---|
| AU | 2020249425 | 10/2021 |
| AU | 2020249420 B2 | 1/2023 |
| AU | 2020249424 | 3/2023 |
| AU | 2020249425 A1 | 3/2023 |
| AU | 2019373730 A1 | 4/2023 |
| AU | 2020247109 B2 | 6/2023 |
| AU | 2020247388 B2 | 6/2023 |
| AU | 2020247386 | 10/2023 |
| AU | 2020247107 | 1/2024 |
| AU | 2023200489 | 3/2024 |
| BR | 112012021937 | 6/2018 |
| CA | 3134738 | 2/2024 |
| CN | 101133343 A | 2/2008 |
| CN | 102150448 A | 8/2011 |
| CN | 202703516 U | 1/2013 |
| CN | 103544746 A | 1/2014 |
| CN | 104063930 A | 9/2014 |
| CN | 104320156 | 1/2015 |
| CN | 104620552 A | 5/2015 |
| CN | 104661308 A | 5/2015 |
| CN | 105378648 | 3/2016 |
| CN | 105723043 A | 6/2016 |
| CN | 105931326 A | 9/2016 |
| CN | 106934887 | 7/2017 |
| CN | 107206966 A | 9/2017 |
| CN | 107730663 A | 2/2018 |
| CN | 108475447 A | 8/2018 |
| CN | 108701177 A | 10/2018 |
| CN | 108701382 A | 10/2018 |
| CN | 108702360 | 10/2018 |
| CN | 108778855 A | 11/2018 |
| CN | 109074618 A | 12/2018 |
| CN | 109076487 A | 12/2018 |
| CN | 109286649 | 1/2019 |
| CN | 111738377 A | 10/2020 |
| CN | 111738378 A | 10/2020 |
| CN | 212724046 | 3/2021 |
| CN | 113039823 A | 6/2021 |
| CN | 213814729 | 7/2021 |
| CN | 113614559 A | 11/2021 |
| CN | 113614797 A | 11/2021 |
| CN | 113614798 A | 11/2021 |
| CN | 113631947 A | 11/2021 |
| CN | 113678014 A | 11/2021 |
| CN | 116071857 A | 5/2023 |
| CN | 113614798 B | 8/2023 |
| CN | 117037332 | 11/2023 |
| CN | 113614797 | 4/2024 |
| CN | 118135693 | 6/2024 |
| CN | 113039823 | 7/2024 |
| CN | 113631947 | 9/2024 |
| CN | 113678014 | 9/2024 |
| CN | 118612704 | 9/2024 |
| DE | 102017110144 A1 | 10/2018 |
| EP | 2355050 A2 | 8/2011 |
| EP | 2706720 A1 | 3/2014 |
| EP | 2617242 B1 | 10/2016 |
| EP | 3101874 A1 | 12/2016 |
| EP | 3118820 A1 | 1/2017 |
| EP | 3355281 A1 | 8/2018 |
| EP | 3376475 A1 | 9/2018 |
| EP | 3928111 A1 | 12/2021 |
| EP | 3928297 | 11/2023 |
| IN | 202117041715 A | 12/2021 |
| IN | 202117042210 A | 12/2021 |
| IN | 202117019181 A | 1/2022 |
| IN | 202117041276 A | 8/2022 |
| IN | 202117041409 A | 9/2022 |
| IN | 202117041414 A | 9/2022 |
| IN | 202117041712 A | 9/2022 |
| IN | 202117041714 A | 9/2022 |
| IN | 481348 | 12/2023 |
| IN | 525285 | 3/2024 |
| JP | H02186082 A | 7/1990 |
| JP | H10210040 | 8/1998 |
| JP | 2002334361 A | 11/2002 |
| JP | 2005320742 A | 11/2005 |
| JP | 2007066107 A | 3/2007 |
| JP | 2007102405 A | 4/2007 |
| JP | 2007316980 A | 12/2007 |
| JP | 2008074157 | 4/2008 |
| JP | 2008205548 A | 9/2008 |
| JP | 2009075010 A | 4/2009 |
| JP | 2009127284 A | 6/2009 |
| JP | 2010079609 A | 4/2010 |
| JP | 2010126898 A | 6/2010 |
| JP | 2010177205 | 8/2010 |
| JP | 2010226246 A | 10/2010 |
| JP | 2010277557 A | 12/2010 |
| JP | 2012511761 A | 5/2012 |
| JP | 2014227647 | 12/2014 |
| JP | 2015090583 A | 5/2015 |
| JP | 2015106266 A | 6/2015 |
| JP | 2015227594 A | 12/2015 |
| JP | 2016082372 | 5/2016 |
| JP | 2016094801 A | 5/2016 |
| JP | 2016165061 | 9/2016 |
| JP | 2017029701 A | 2/2017 |
| JP | 6205237 B2 | 9/2017 |
| JP | 2017538875 A | 12/2017 |
| JP | 2018071190 | 5/2018 |
| JP | 2018071213 | 5/2018 |

(56) References Cited

FOREIGN PATENT DOCUMENTS

| | | |
|---|---|---|
| JP | 6419202 B2 | 10/2018 |
| JP | 2018165450 | 10/2018 |
| JP | 2018178506 A | 11/2018 |
| JP | 2018206355 A | 12/2018 |
| JP | 2018537017 A | 12/2018 |
| JP | 2019528387 A | 10/2019 |
| JP | 2020510567 A | 4/2020 |
| JP | 2022506040 A | 1/2022 |
| JP | 2022526155 A | 5/2022 |
| JP | 2022526335 A | 5/2022 |
| JP | 2022526336 A | 5/2022 |
| JP | 2022526337 A | 5/2022 |
| JP | 2022527064 A | 5/2022 |
| JP | 2022527065 A | 5/2022 |
| JP | 2022528637 A | 6/2022 |
| JP | 7213967 B2 | 1/2023 |
| JP | 7225431 B2 | 2/2023 |
| JP | 7228056 B2 | 2/2023 |
| JP | 7241909 B2 | 3/2023 |
| JP | 2023054074 A | 4/2023 |
| JP | 2023071643 A | 5/2023 |
| JP | 2023071680 A | 5/2023 |
| JP | 2023080067 A | 6/2023 |
| JP | 7389816 | 11/2023 |
| JP | 7391987 | 11/2023 |
| JP | 7395609 | 12/2023 |
| JP | 7395610 | 12/2023 |
| JP | 7408858 | 12/2023 |
| JP | 2024014972 | 2/2024 |
| JP | 7467702 | 4/2024 |
| JP | 7480378 | 5/2024 |
| JP | 2024096764 | 7/2024 |
| JP | 2024112806 | 8/2024 |
| KR | 101077406 B1 | 10/2011 |
| KR | 20170023012 | 3/2017 |
| KR | 20170040240 A | 4/2017 |
| KR | 20170140367 A | 12/2017 |
| KR | 20180087429 A | 8/2018 |
| KR | 20190023713 A | 3/2019 |
| KR | 102592842 | 10/2023 |
| KR | 102612414 | 12/2023 |
| KR | 102650075 | 3/2024 |
| KR | 102650599 | 3/2024 |
| KR | 102651436 | 3/2024 |
| KR | 102651437 | 3/2024 |
| KR | 102663726 | 4/2024 |
| KR | 102669171 | 5/2024 |
| KR | 102689461 | 7/2024 |
| MX | PA03010049 A | 12/2004 |
| MX | 2021011587 A | 7/2023 |
| MX | 416714 | 9/2024 |
| MX | 2021011638 | 10/2024 |
| WO | WO-2013178163 A1 | 12/2013 |
| WO | WO-2014016695 A2 | 1/2014 |
| WO | 2014109033 | 7/2014 |
| WO | WO-2016007627 A1 | 1/2016 |
| WO | WO-2016059451 A1 | 4/2016 |
| WO | WO-2016089837 A1 | 6/2016 |
| WO | WO-2017058925 A1 | 4/2017 |
| WO | WO-2017136725 A1 | 8/2017 |
| WO | WO-2017144345 A1 | 8/2017 |
| WO | WO-2017181132 A2 | 10/2017 |
| WO | WO-2018071671 A2 | 4/2018 |
| WO | WO-2018091660 A1 | 5/2018 |
| WO | WO-2018148687 A1 | 8/2018 |
| WO | WO-2019016599 A1 | 1/2019 |
| WO | WO-2019224329 A1 | 11/2019 |
| WO | 2020066202 | 4/2020 |
| WO | WO-2020089484 A1 | 5/2020 |
| WO | WO-2020193566 A1 | 10/2020 |
| WO | WO-2020193568 A1 | 10/2020 |
| WO | WO-2020193570 A1 | 10/2020 |
| WO | WO-2020193576 A1 | 10/2020 |
| WO | WO-2020193577 A1 | 10/2020 |
| WO | WO-2020193578 A1 | 10/2020 |
| WO | WO-2020193580 A1 | 10/2020 |

OTHER PUBLICATIONS

"Chinese Application Serial No. 202080023759.5, Office Action mailed Mar. 7, 2024", with English translation, 18 pages.

"Canadian Application Serial No. 3,117,588, Examiners Rule 86(2) Requisition mailed Mar. 27, 2023", 4 pgs.

"European Application Serial No. 20714987.3, Response filed Mar. 28, 2024 to Communication Pursuant to Article 94(3) EPC mailed Dec. 6, 2023", 12 pgs.

"Chinese Application Serial No. 202080023681.7, Office Action mailed Mar. 9, 2024", with English translation, 23 pages.

"U.S. Appl. No. 17/593,340, Supplemental Notice of Allowability mailed Apr. 11, 2024", 2 pgs.

"U.S. Appl. No. 17/593,340, Notice of Allowability mailed May 22, 2024", 2 pgs.

"U.S. Appl. No. 18/446,657, Response filed May 24, 2024 to Non Final Office Action mailed Feb. 29, 2024", 2 pgs.

"Chinese Application Serial No. 202080024366.6, Response filed May 28, 2024 to Office Action mailed Jan. 31, 2024", with English claims, 38 pages.

"Canadian Application Serial No. 3,134,931, Office Action mailed May 23, 2024", 3 pgs.

"U.S. Appl. No. 17/593,340, Supplemental Notice of Allowability mailed May 29, 2024", 2 pgs.

"U.S. Appl. No. 18/507,275, Non Final Office Action mailed Jun. 6, 2024", 8 pgs.

"Mexican Application Serial No. MX a 2021 004981, Office Action mailed May 21, 2024", with machine English translation, 8 pages.

"U.S. Appl. No. 18/507,275, Response filed Jun. 11, 2024 to Non Final Office Action mailed Jun. 6, 2024", 8 pgs.

"European Application Serial No. 20714984.0, Communication Pursuant to Article 94(3) EPC mailed Jun. 12, 2024", 6 pgs.

"U.S. Appl. No. 18/446,657, Notice of Allowance mailed Jun. 20, 2024", 10 pgs.

"Chinese Application Serial No. 202080024366.6, Response Filed Jun. 17, 2024 to Consultation by Telephone in Person filed Jun. 17, 2024", with English claims, 36 pages.

"U.S. Appl. No. 18/446,657, Corrected Notice of Allowability mailed Jun. 25, 2024", 2 pgs.

"Mexican Application Serial No. MX a 2021 004981, Voluntary Amendment Filed Apr. 3, 2024", with English claims, 17 pages.

"Indian Application Serial No. 202117041409, Hearing Notice mailed Jul. 4, 2024", with English translation, 2 pages.

"European Application Serial No. 20714548.3, Communication Pursuant to Article 94(3) EPC mailed Jul. 5, 2024", 4 pages.

"U.S. Appl. No. 18/507,275, Notice of Allowance mailed Jul. 12, 2024", 8 pgs.

"European Application Serial No. 20714545.9, Communication Pursuant to Article 94(3) EPC mailed Jul. 11, 2024", 9 pgs.

"Chinese Application Serial No. 202080023759.5, Response Filed Jun. 20, 2024 to Consultation by Telephone in Person Filed Jun. 17, 2024", with English claims, 33 pages.

"Chinese Application Serial No. 202080023759.5, Response Filed May 24, 2024 to Office Action mailed Mar. 7, 2024", with English claims, 12 pages.

"European Application Serial No. 20714988.1, Communication Pursuant to Article 94(3) EPC mailed Jul. 11, 2024", 5 pgs.

"Korean Application Serial No. 10-2021-7030781, Response Filed Apr. 30, 2024 to Final Office Action mailed Jan. 30, 2024", with English claims, 16 pages.

"Canadian Application Serial No. 3, 117,588, Response filed Jul. 22, 2024 to Examiners Rule 86(2) Requisition mailed Mar. 27, 2023", 11 pgs.

"Chinese Application Serial No. 202080023681.7, Office Action mailed Jul. 6, 2024", with English translation, 26 pages.

"Mexican Application Serial No. MX a 2021 004981, Response filed Jul. 18, 2024 to Office Action mailed May 21, 2024", with English claims, 49 pages.

(56) References Cited

OTHER PUBLICATIONS

"U.S. Appl. No. 18/507,275, Supplemental Notice of Allowability mailed Jul. 26, 2024", 2 pgs.
"Indian Application Serial No. 202117041414, Hearing Notice mailed Jul. 25, 2024", with English translation, 3 pages.
"European Application Serial No. 20714988.1, Response Filed Mar. 27, 2024 to Communication Pursuant to Article 94(3) EPC mailed Nov. 29, 2023", 14 pgs.
"Chinese Application Serial No. 201980073003.9, Response Filed Apr. 9, 2024 to Office Action mailed Feb. 29, 2024", with English claims, 14 pages.
"Chinese Application Serial No. 202080023681.7, Response Filed May 28, 2024 to Office Action mailed Mar. 9, 2024", with English claims, 37 pages.
"Japanese Application Serial No. 2023-019246, Notification of Reasons for Refusal mailed Aug. 6, 2024", with English translation, 8 pages.
"Japanese Application Serial No. 2023-019246, Office Action Response filed May 15, 2024 to Notification of Reasons for Refusal mailed Feb. 20, 2024", with English claims, 16 pages.
"Korean Application Serial No. 10-2021-7030782, Notice of Preliminary Rejection mailed Jul. 25, 2024", with English translation, 11 pages.
"Indian Application Serial No. 202117041409, Response Filed Aug. 9, 2024 to Hearing Notice mailed Jul. 4, 2024", with English claims, 92 pages.
"Mexican Application Serial No. MX a 2021 011595, Voluntary Amendment Filed Apr. 10, 2024", with English claims, 14 pages.
"Mexican Application Serial No. MX a 2021 011636, Voluntary Amendment filed Apr. 10, 2024", with English claims, 12 pages.
"Mexican Application Serial No. MX a 2021 011640, Voluntary Amendment filed Apr. 10, 2024", with English claims, 12 pages.
"Mexican Application Serial No. MX a 2021 011638, Voluntary Amendment filed Apr. 10, 2024", with English claims, 13 pages.
"Mexican Application Serial No. MX a 2021-011591, Voluntary Amendment filed Apr. 10, 2024", with English claims, 14 pages.
"Mexican Application Serial No. MX a 2021 011639, Voluntary Amendment filed Apr. 10, 2024", with English claims, 13 pages.
"Canadian Application Serial No. 3134867 Examiners Rule 86 2 Requisition mailed Aug. 20, 2024", 6 pgs.
"Mexican Application Serial No. MX a 2021 011591, Office Action mailed Jul. 23, 2024", with English translation, 9 pages.
Hu, Chunqiang, "Secure and Efficient Data Communication Protocol for Wireless Body Area Networks", IEEE Transactions on Multi-Scale Computing Systems, vol. 2, Issue: 2, [Online]. Retrieved from the Internet: https: ieeexplore.ieee.org stamp stamp.jsp?tp=andarnumber=7399415, (2016), 14 pages.
Ran, Moshe, "Ultra-wideband radio-over-optical fiber: Technologies and applications", IEEE International Conference on Ultra-Wideband, [Online]. Retrieved from the Internet: https: ieeexplore.ieee.org stamp stamp.jsp?tp=andarnumber=4653438, (2008), 15 pages.
Wilhelm, Matthias, "Secure Key Generation in Sensor Networks Based on Frequency-Selective Channels", IEEE Journal on Selected Areas in Communications, vol. 31, Issue: 9, [Online]. Retrieved from the Internet: https: ieeexplore.ieee.org stamp stamp.jsp?tp=andarnumber=6584937, (2013), 13 pages.
"Chinese Application Serial No. 202020398075.0, Office Action mailed Aug. 11, 2020", with English translation, 3 pages.
"Chinese Application Serial No. 202020396956.9, Office Action mailed Aug. 11, 2020", with English translation, 3 pages.
"Chinese Application Serial No. 202020396956.9, Notification to Make Rectification mailed Nov. 5, 2020", with Concise Statement of Relevance, 2 pages.
"Chinese Application Serial No. 202020398075.0, Notification to Make Rectification mailed Nov. 5, 2020", with Concise Statement of Relevance, 2 pages.
"Chinese Application Serial No. 202020396956.9, Response filed Jan. 20, 2021 to Notification to Make Rectification mailed Nov. 5, 2020", with Concise Statement of Relevance, 40 pages.
"Chinese Application Serial No. 202020398075.0, Response filed Jan. 20, 2021 to Notification to Make Rectification mailed Nov. 5, 2020", with Concise Statement of Relevance, 40 pages.
"Chinese Application Serial No. 202020396956.9, Notification to Make Rectification mailed Feb. 4, 2021", with Concise Statement of Relevance, 2 pages.
"Chinese Application Serial No. 202020396956.9, Response filed Apr. 12, 2021 to Notification to Make Rectification mailed Feb. 4, 2021", with Concise Statement of Relevance, 37 pages.
"Mexican Application Serial No. MX a 2021 011587, Office Action mailed Oct. 6, 2021", with machine English translation, 7 pages.
"Mexican Application Serial No. MX a 2021 011591, Office Action mailed Oct. 6, 2021", with machine English translation, 7 pages.
"Mexican Application Serial No. MX a 2021 011595, Office Action mailed Oct. 6, 2021", with machine English translation, 7 pages.
"Mexican Application Serial No. MX a 2021 011639, Office Action mailed Oct. 11, 2021", with machine English translation, 7 pages.
"Mexican Application Serial No. MX a 2021 011638, Office Action mailed Oct. 11, 2021", with machine English translation, 7 pages.
"Mexican Application Serial No. MX a 2021 011640, Office Action mailed Oct. 11, 2021", with machine English translation, 7 pages.
"Mexican Application Serial No. MX a 2021 011636, Office Action mailed Oct. 11, 2021", with machine English translation, 7 pages.
"Korean Application Serial No. 10-2021-7030696, Notice of Preliminary Rejection mailed Sep. 19, 2023", with English translation, 6 pages.
"U.S. Appl. No. 17/593,340, Response filed Oct. 11, 2023 to Non Final Office Action mailed Jul. 12, 2023", 9 pgs.
"U.S. Appl. No. 17/593,180, Response filed Oct. 18, 2023 to Advisory Action mailed Oct. 6, 2023", 10 pgs.
"Korean Application Serial No. 10-2021-7030781, Response Filed Sep. 20, 2023 to Notice of Preliminary Rejection mailed Jul. 20, 2023", with machine English translation, No Amendments to Claims, 16 pages.
"Korean Application Serial No. 10-2021-7030765, Response Filed Sep. 21, 2023 to Notice of Preliminary Rejection mailed Jul. 28, 2023", with English claims, 26 pages.
"Korean Application Serial No. 10-2021-7030699, Response Filed Sep. 25, 2023 to Notice of Preliminary Rejection mailed Jul. 28, 2023", with English claims, 31 pages.
"Korean Application Serial No. 10-2021-7030785, Response Filed Oct. 4, 2023 to Notice of Preliminary Rejection mailed Jul. 28, 2023", with English claims, 30 pages.
"U.S. Appl. No. 18/507,275, Preliminary Amendment filed Nov. 13, 2023", 10 pgs.
"Chinese Application Serial No. 202080023684.0, Response Filed Nov. 10, 2023 to Decision of Rejection mailed Jul. 27, 2023", with English claims, 10 pages.
"European Application Serial No. 20714988.1, Communication Pursuant to Article 94(3) EPC mailed Nov. 29, 2023", 6 pgs.
"European Application Serial No. 20714987.3, Communication Pursuant to Article 94(3) EPC mailed Dec. 6, 2023", 5 pgs.
"Korean Application Serial No. 10-2021-7030782, Notice of Preliminary Rejection mailed Nov. 23, 2023", with English translation, 9 pages.
"Korean Application Serial No. 10-2021-7030696, Response filed Nov. 20, 2023 to Notice of Preliminary Rejection mailed Sep. 19, 2023", with English claims, 26 pages.
Google, "Google: "core java android companion BluetoothLeDeviceFilter.java—platform frameworks base—Git at Google"", Android Core Code, Bluetooth Companion, (Jan. 1, 2017), 9 pages.
"U.S. Appl. No. 17/593,180, Supplemental Notice of Allowability mailed Jan. 4, 2024", 2 pgs.
"U.S. Appl. No. 17/593,340, Notice of Allowance mailed Jan. 10, 2024", 5 pgs.
"Indian Application Serial No. 202117041715, Hearing Notice mailed Jan. 17, 2024", with English translation, 3 pages.
"Canadian Application Serial No. 3,134,864, Response Filed Dec. 13, 2023 to Office Action mailed Aug. 23, 2023", 6 pgs.
"U.S. Appl. No. 17/593,174, Corrected Notice of Allowability mailed Feb. 1, 2024", 2 pgs.

(56) References Cited

OTHER PUBLICATIONS

"Canadian Application Serial No. 3,134,931, Response filed Jan. 29, 2024 to Office Action mailed Oct. 5, 2023", 14 pgs.
"European Application Serial No. 20714986.5, Communication Pursuant to Article 94(3) EPC mailed Feb. 6, 2024", 4 pgs.
"Chinese Application Serial No. 202080023684.0, Response Filed Jan. 16, 2024 to Consultation by Telephone in Person—Response Needed filed Jan. 16, 2024", with English claims, 7 pages.
"Korean Application Serial No. 10-2021-7030781, Final Office Action mailed Jan. 30, 2024", with English translation, 5 pages.
"Canadian Application Serial No. 3,134,749, Response Filed Jan. 8, 2024 to Examiners Rule 86(2) Report mailed Sep. 13, 2023", 9 pgs.
"Canadian Application Serial No. 3,134,867, Response Filed Jan. 9, 2024 to Examiners Rule 86(2) Report mailed Sep. 13, 2023", 3 pgs.
"Chinese Application Serial No. 201980073003.9, Response Filed Jan. 16, 2024 to Office Action mailed Sep. 1, 2023", with English claims, 16 pages.
"Chinese Application Serial No. 202080024366.6, Office Action mailed Jan. 31, 2024", with English translation, 20 pages.
"Japanese Application Serial No. 2023-019246, Notification of Reasons for Refusal mailed Feb. 20, 24", with English translation, 12 pages.
"U.S. Appl. No. 18/446,657, Non Final Office Action mailed Feb. 29, 2024", 9 pgs.
"Australian Application Serial No. 2023200489, Response filed Feb. 29, 2024 to First Examination Report mailed Sep. 11, 2023", 84 pgs.
"Australian Application Seril No. 2023201391, First Examination Report mailed Feb. 21, 2024", 5 pgs.
"Japanese Application Serial No. 2023-005052, Response Filed Jan. 17, 2024 to Notification of Reasons for Refusal mailed Oct. 17, 2023", with English claims, 8 pages.
"Korean Application Serial No. 10-2021-7030782, Response Filed Jan. 23, 2024 to Notice of Preliminary Rejection mailed Nov. 23, 2023", with English claims, 15 pages.
"Chinese Application Serial No. 201980073003.9, Office Action mailed Feb. 29, 2024", with English translation, 8 pages.
"Mexican Application Serial No. MX a 2021 011636, Office Action mailed Aug. 2, 2024", With English Machine Translation, 14 pgs.
"Australian Application Serial No. 2023201391, Subsequent Examination Report mailed Aug. 19, 2024", 3 pgs.
"Australian Application Serial No. 2023203748, First Examination Report mailed Aug. 22, 2024", 3 pgs.
"Chinese Application Serial No. 202010219642.6, Office Action mailed Jul. 16, 2024", with English translation, 30 pages.
"Australian Application Seril No. 2023201391, Response Filed Jul. 31, 2024 to First Examination Report mailed Feb. 21, 2024", 85 pgs.
"U.S. Appl. No. 18/446,657, Notice of Allowability mailed Sep. 12, 2024", 2 pgs.
"Canadian Application Serial No. 3,134,931, Response filed Sep. 12, 2024 to Office Action mailed May 23, 2024", 11 pgs.
"Chinese Application Serial No. 202010220452.6, Office Action mailed Jul. 16, 2024", with English translation, 25 pages.
"Chinese Application Serial No. 202080023681.7, Response filed Sep. 5, 2024 to Office Action mailed Jul. 6, 2024", With English Machine Translation, 8 pgs.
"Indian Application Serial No. 202117041414, Response Filed Sep. 5, 2024 to Hearing Notice mailed Jul. 25, 2024", with English claims, 182 pages.
"U.S. Appl. No. 18/507,275, Supplemental Notice of Allowability mailed Sep. 25, 2024", 2 pgs.
"Mexican Application Serial No. MX a 2021 011639, Office Action mailed Aug. 12, 2024", with manual English translation, 9 pages.
"Mexican Application Serial No. MX a 2021 011640, Office Action mailed Aug. 12, 2024", with manual English translation, 9 pages.
"U.S. Appl. No. 18/446,657, Corrected Notice of Allowability mailed Sep. 27, 2024", 2 pgs.
"Japanese Application Serial No. 2021-557174, Office Action mailed Sep. 27, 2024", with client provided machine English translation, 109 pages.
"Australian Application Serial No. 2023201391, Response Filed Sep. 20, 2024 to Subsequent Examination Report mailed Aug. 19, 2024", 80 pgs.
"Korean Application Serial No. 10-2021-7030782, Response Filed Sep. 25, 2024 to Notice of Preliminary Rejection mailed Jul. 25, 2024", with English claims, 10 pages.
"Korean Application Serial No. 10-2021-7030781, Response Filed Sep. 30, 2024 to Notice of Dismissal of Amendment and Notice of Second Final Decision mailed Jun. 28, 2024", with English claims, 13 pages.
"Korean Application Serial No. 10-2021-7030781, Notice of Dismissal of Amendment and Notice of Second Final Decision mailed Jun. 27, 2024", with English translation, 6 pages.
"Canadian Application Serial No. Net Yet Determined, Voluntary Amendment filed Jul. 22, 2024", 9 pgs.
"European Application Serial No. 20714548.3, Response Filed Oct. 7, 2024 to Communication Pursuant to Article 94(3) EPC mailed Jul. 5, 2024", 11 pgs.
"U.S. Appl. No. 18/507,275, Supplemental Notice of Allowability mailed Oct. 17, 2024", 2 pgs.
"European Application Serial No. 20714987.3, Communication Pursuant to Article 94(3) EPC mailed Oct. 15, 2024", 5 pgs.
"European Application Serial No. 20714984.0, Response filed Oct. 9, 2024 to Communication Pursuant to Article 94(3) EPC mailed Jun. 12, 2024", 49 pgs.
"Mexican Application Serial No. MX a 2021 011591, Response Filed Oct. 8, 2024 to Office Action mailed Jul. 23, 2024", with English claims, 19 pages.
"Mexican Application Serial No. MX a 2021 011636, Response filed Oct. 17, 2024 to Office Action mailed Aug. 2, 2024", with English claims, 13 pages.
"U.S. Appl. No. 16/828,001, Non Final Office Action mailed Feb. 17, 2022", 10 pgs.
"U.S. Appl. No. 16/828,001, Notice of Allowance mailed Jun. 8, 2022", 10 pgs.
"U.S. Appl. No. 16/828,001, Response filed May 16, 2022 to Non Final Office Action mailed Feb. 17, 2022", 13 pgs.
"U.S. Appl. No. 17/309,102, Corrected Notice of Allowability mailed Nov. 1, 2023", 5 pgs.
"U.S. Appl. No. 17/309,102, Final Office Action mailed Jul. 25, 2023", 10 pgs.
"U.S. Appl. No. 17/309,102, Non Final Office Action mailed Mar. 28, 2023", 10 pgs.
"U.S. Appl. No. 17/309,102, Notice of Allowance mailed Oct. 19, 2023", 7 pgs.
"U.S. Appl. No. 17/309,102, Preliminary Amendment Filed Apr. 23, 2021", 8 pgs.
"U.S. Appl. No. 17/309,102, Response filed Jun. 26, 2023 to Non Final Office Action mailed Mar. 28, 2023", 11 pgs.
"U.S. Appl. No. 17/309,102, Response filed Sep. 22, 2023 to Final Office Action mailed Jul. 25, 2023", 12 pgs.
"U.S. Appl. No. 17/309,102, Supplemental Notice of Allowability mailed Nov. 20, 2023", 2 pgs.
"U.S. Appl. No. 17/593,174 Preliminary Amendment filed Sep. 10, 2021", 7 pgs.
"U.S. Appl. No. 17/593,174, Non Final Office Action mailed Apr. 27, 2023", 11 pgs.
"U.S. Appl. No. 17/593,174, Notice of Allowability mailed Nov. 9, 2023", 2 pgs.
"U.S. Appl. No. 17/593,174, Notice of Allowability mailed Nov. 17, 2023", 2 pgs.
"U.S. Appl. No. 17/593,174, Response filed Jul. 27, 2023 to Non Final Office Action mailed Apr. 27, 2023", 10 pgs.
"U.S. Appl. No. 17/593,180 Preliminary Amendment filed Sep. 10, 2021", 6 pgs.
"U.S. Appl. No. 17/593,180, Advisory Action mailed Oct. 6, 2023", 3 pgs.
"U.S. Appl. No. 17/593,180, Final Office Action mailed Jul. 27, 2023", 14 pgs.
"U.S. Appl. No. 17/593,180, Non Final Office Action mailed Mar. 2, 2023", 15 pgs.
"U.S. Appl. No. 17/593,180, Notice of Allowance mailed Oct. 30, 2023", 9 pgs.

(56) References Cited

OTHER PUBLICATIONS

"U.S. Appl. No. 17/593,180, Response filed May 24, 2023 to Non Final Office Action mailed Mar. 2, 2023", 12 pgs.
"U.S. Appl. No. 17/593,180, Response filed Sep. 22, 2023 to Final Office Action mailed Jul. 27, 2023", 10 pgs.
"U.S. Appl. No. 17/593,180, Supplemental Notice of Allowability mailed Nov. 8, 2023", 2 pgs.
"U.S. Appl. No. 17/593,180, Supplemental Notice of Allowability mailed Nov. 16, 2023", 2 pgs.
"U.S. Appl. No. 17/593,336 Preliminary Amendment filed Sep. 15, 2021", 8 pgs.
"U.S. Appl. No. 17/593,336, Non Final Office Action mailed Apr. 3, 2023", 12 pgs.
"U.S. Appl. No. 17/593,336, Notice of Allowance mailed Oct. 2, 2023", 5 pgs.
"U.S. Appl. No. 17/593,336, Response filed Jun. 28, 2023 to Non Final Office Action mailed Apr. 3, 2023", 12 pgs.
"U.S. Appl. No. 17/593,336, Supplemental Notice of Allowability mailed Dec. 21, 2023", 2 pgs.
"U.S. Appl. No. 17/593,338 Preliminary Amendment filed Sep. 15, 2021", 6 pgs.
"U.S. Appl. No. 17/593,338, Corrected Notice of Allowability mailed Sep. 21, 2023", 3 pgs.
"U.S. Appl. No. 17/593,338, Corrected Notice of Allowability mailed Oct. 20, 2023", 2 pgs.
"U.S. Appl. No. 17/593,338, Non Final Office Action mailed Dec. 20, 2022", 10 pgs.
"U.S. Appl. No. 17/593,338, Notice of Allowance mailed Jun. 14, 2023", 10 pgs.
"U.S. Appl. No. 17/593,338, Response filed Mar. 1, 2023 to Non Final Office Action mailed Dec. 20, 2022", 12 pgs.
"U.S. Appl. No. 17/593,338, Supplemental Notice of Allowability mailed Jul. 6, 2023", 3 pgs.
"U.S. Appl. No. 17/593,338, Supplemental Notice of Allowability mailed Aug. 9, 2023", 3 pgs.
"U.S. Appl. No. 17/593,340 Preliminary Amendment filed Sep. 15, 2021", 7 pgs.
"U.S. Appl. No. 17/593,340, Non Final Office Action mailed Jul. 12, 2023", 8 pgs.
"U.S. Appl. No. 17/593,342, Non Final Office Action mailed Jan. 25, 2023", 12 pgs.
"U.S. Appl. No. 17/593,342, Notice of Allowance mailed May 10, 2023", 5 pgs.
"U.S. Appl. No. 17/593,342, Response filed Apr. 12, 2023 to Non Final Office Action mailed Jan. 25, 2023", 13 pgs.
"U.S. Appl. No. 17/593,342, Supplemental Notice of Allowability mailed May 22, 2023", 2 pgs.
"U.S. Appl. No. 17/593,342, Supplemental Notice of Allowability mailed Aug. 1, 2023", 2 pgs.
"U.S. Appl. No. 17/593,342, Supplemental Notice of Allowability mailed Aug. 22, 2023", 2 pgs.
"U.S. Appl. No. 17/812,426, Corrected Notice of Allowability mailed Aug. 17, 2023", 3 pgs.
"U.S. Appl. No. 17/812,426, Non Final Office Action mailed Mar. 2, 2023", 10 pgs.
"U.S. Appl. No. 17/812,426, Notice of Allowance mailed May 8, 2023", 10 pgs.
"U.S. Appl. No. 17/812,426, Preliminary Amendment Filed Jul. 13, 2022", 12 pgs.
"U.S. Appl. No. 17/812,426, Response filed Apr. 19, 2023 to Non Final Office Action mailed Mar. 2, 2023", 9 pgs.
"U.S. Appl. No. 17/994,839, Notice of Allowability mailed Oct. 27, 2023", 2 pgs.
"Australia Application Serial No. 2020247107, Response Filed May 22, 2023 to Subsequent Examiners Report mailed Feb. 28, 2023", No Amendments to Claims, 3 pgs.
"Australia Application Serial No. 2020247107, Subsequent Examiners Report mailed Feb. 28, 2023", 3 pgs.
"Australian Application Serial No. 2019373730, First Examination Report mailed Apr. 11, 2022", 4 pgs.
"Australian Application Serial No. 2019373730, Response Filed Dec. 1, 2022 to Subsequent Examiners Report mailed Sep. 21, 2022", 18 pgs.
"Australian Application Serial No. 2019373730, Response Filed Aug. 26, 2022 to First Examination Report mailed Apr. 11, 2022", 15 pgs.
"Australian Application Serial No. 2019373730, Subsequent Examiners Report mailed Sep. 21, 2022", 7 pgs.
"Australian Application Serial No. 2020247107, First Examination Report mailed Sep. 13, 2022", 4 pgs.
"Australian Application Serial No. 2020247107, Response Filed Jan. 31, 2023 to First Examination Report mailed Sep. 13, 2022", 15 pgs.
"Australian Application Serial No. 2020247107, Response Filed Aug. 14, 2023 to Subsequent Examiners Report mailed Jun. 22, 2023", 13 pgs.
"Australian Application Serial No. 2020247107, Subsequent Examiners Report mailed Jun. 22, 2023", 3 pgs.
"Australian Application Serial No. 2020247109, First Examination Report mailed Jun. 21, 2022", 3 pgs.
"Australian Application Serial No. 2020247109, Response Filed Jan. 31, 2023 to Subsequent Examiners Report mailed Oct. 28, 2022", 8 pgs.
"Australian Application Serial No. 2020247109, Response Filed Oct. 3, 2022 to First Examination Report mailed Jun. 21, 2022", 10 pgs.
"Australian Application Serial No. 2020247109, Subsequent Examiners Report mailed Oct. 28, 2022", 3 pgs.
"Australian Application Serial No. 2020247386, First Examination Report mailed Aug. 30, 2022", 3 pgs.
"Australian Application Serial No. 2020247386, Response Filed Dec. 21, 2022 to First Examination Report mailed Aug. 30, 2022", 11 pgs.
"Australian Application Serial No. 2020247386, Response Filed Mar. 20, 2023 to Subsequent Examiners Report mailed Dec. 23, 2022", No Claim Amendments, 2 pgs.
"Australian Application Serial No. 2020247386, Response Filed May 29, 2023 to Subsequent Examiners Report mailed Apr. 13, 2023", No Amendments to Claims, 2 pgs.
"Australian Application Serial No. 2020247386, Subsequent Examiners Report mailed Apr. 13, 2023", 3 pgs.
"Australian Application Serial No. 2020247386, Subsequent Examiners Report mailed Dec. 23, 2022", 3 pgs.
"Australian Application Serial No. 2020247388, First Examination Report mailed Jul. 26, 2022", 3 pgs.
"Australian Application Serial No. 2020247388, Response Filed Jan. 31, 2023 to Subsequent Examiners Report mailed Nov. 17, 2022", 12 pgs.
"Australian Application Serial No. 2020247388, Response filed Oct. 26, 2022 to First Examination Report mailed Jul. 26, 2022", 120 pgs.
"Australian Application Serial No. 2020247388, Subsequent Examiners Report mailed Nov. 17, 2022", 3 pgs.
"Australian Application Serial No. 2020249420, First Examination Report mailed Jul. 12, 2022", 3 pgs.
"Australian Application Serial No. 2020249420, Response Filed Sep. 21, 2022 to First Examination Report mailed Jul. 12, 22", 12 pgs.
"Australian Application Serial No. 2020249424, First Examination Report mailed Jul. 7, 2022", 3 pgs.
"Australian Application Serial No. 2020249424, Response filed Oct. 26, 2022 to First Examination Report mailed Jul. 7, 2022", 121 pgs.
"Australian Application Serial No. 2020249425, First Examination Report mailed Jul. 20, 2022", 3 pgs.
"Australian Application Serial No. 2020249425, Response filed Oct. 11, 2022 Filed to First Examination Report mailed Jul. 20, 2022", 9 pgs.
"Australian Application Serial No. 2023200489, First Examination Report mailed Sep. 11, 2023", 3 pgs.
"Canadian Application Serial No. 3,070,588, Non Final Office Action mailed May 12, 2022", 4 pgs.

(56) References Cited

OTHER PUBLICATIONS

"Canadian Application Serial No. 3,070,588, Response Filed Sep. 8, 2022 to Non Final Office Action mailed May 12, 2022", 15 pgs.
"Canadian Application Serial No. 3,117,588, Examiners Rule 86(2) Requisition mailed Mar. 14, 2023", 7 pgs.
"Canadian Application Serial No. 3,117,588, Response Filed Jul. 6, 2023 to Examiners Rule 86(2) Requisition mailed Mar. 14, 2023", 28 pgs.
"Canadian Application Serial No. 3,134,738, Examiner's Rule 86(2) Requisition mailed Nov. 18, 2022", 4 pgs.
"Canadian Application Serial No. 3,134,738, Response filed Mar. 13, 2023 to Examiner's Rule 86(2) Requisition mailed Nov. 18, 2022", 10 pgs.
"Canadian Application Serial No. 3,134,749, Examiners Rule 86(2) Report mailed Sep. 23, 2023", 4 pgs.
"Canadian Application Serial No. 3,134,749, Response filed Mar. 27, 2023 to Examiner's Rule 86(2) Report mailed Dec. 1, 2022", 10 pgs.
"Canadian Application Serial No. 3,134,751, Examiner's Rule 86(2) Requisition mailed Nov. 18, 2022", 5 pgs.
"Canadian Application Serial No. 3,134,751, Response filed Mar. 16, 2023 to Examiner's Rule 86(2) Requisition mailed Nov. 18, 2022", 13 pgs.
"Canadian Application Serial No. 3,134,864, Examiner's Rule 86(2) Requisition mailed Nov. 18, 2022", 4 pgs.
"Canadian Application Serial No. 3,134,864, Office Action mailed Aug. 23, 2023", 3 pgs.
"Canadian Application Serial No. 3,134,864, Response filed Mar. 13, 2023 to Examiner's Rule 86(2) Requisition mailed Nov. 18, 2022", 7 pgs.
"Canadian Application Serial No. 3,134,866, Examiner's Rule 86(2) Requisition mailed Nov. 18, 2022", 4 pgs.
"Canadian Application Serial No. 3,134,866, Response filed Mar. 8, 2023 to Examiner's Rule 86(2) Requisition mailed Nov. 18, 2022", 8 pgs.
"Canadian Application Serial No. 3,134,867, Examiner's Rule 86(2) Requisition mailed Nov. 18, 2022", 4 pgs.
"Canadian Application Serial No. 3,134,867, Examiners Rule 86(2) Report mailed Sep. 13, 2023", 5 pgs.
"Canadian Application Serial No. 3,134,867, Response Filed Mar. 9, 2023 to Examiner's Rule 86(2) Requisition mailed Nov. 18, 2022", No Claim Amendments, 10 pgs.
"Canadian Application Serial No. 3,134,931, Examiner's Rule 86(2) Requisition mailed Dec. 8, 2022", 3 pgs.
"Canadian Application Serial No. 3,134,931, Office Action mailed Oct. 5, 2023", 3 pgs.
"Canadian Application Serial No. 3,134,931, Response Filed Apr. 3, 2023 to Examiner's Rule 86(2) Requisition mailed Dec. 8, 2022", 12 pgs.
"Canadian Application Serial No. 3,134,749, Examiner's Rule 86(2) Report mailed Dec. 1, 2022", 4 pgs.
"Chinese Application Serial No. 201980073003.9, Office Action mailed Sep. 1, 2023", with English translation, 25 pages.
"Chinese Application Serial No. 202080022914.1, Office Action mailed Oct. 24, 2022", with English translation, 20 pages.
"Chinese Application Serial No. 202080022914.1, Response Filed Feb. 17, 2023 to Office Action mailed Oct. 24, 2022", with English claims, 12 pages.
"Chinese Application Serial No. 202080023684.0, Decision of Rejection mailed Jul. 27, 2023", with English translation, 17 pages.
"Chinese Application Serial No. 202080023684.0, Office Action mailed Mar. 22, 2023", with English translation, 15 pages.
"Chinese Application Serial No. 202080023684.0, Office Action mailed Sep. 30, 2022", with English translation, 23 pages.
"Chinese Application Serial No. 202080023684.0, Response Filed Jan. 29, 2023 to Office Action mailed Sep. 30, 2022", with English claims, 33 pages.
"Chinese Application Serial No. 202080023684.0, Response Filed Jun. 5, 2023 to Office Action mailed Mar. 22, 2023", with Concise Statement of Relevance, 4 pages.

"European Application Serial No. 19801788.1, Response to Communication pursuant to Rules 161(1) and 162 EPC filed Nov. 24, 2021", 18 pgs.
"European Application Serial No. 20714545.9, Communication Pursuant to Rule 114(2) EPC mailed Nov. 21, 2022", 53 pgs.
"European Application Serial No. 20714545.9, Communication Pursuant to Rule 114(2) EPC mailed Dec. 1, 2022", 7 pgs.
"European Application Serial No. 20714545.9, Response filed Apr. 12, 2022 to Communication Pursuant to Rule 161(1) and 162 EPC mailed Oct. 5, 2021", 77 pgs.
"European Application Serial No. 20714984.0, Response filed Mar. 30, 2022 Communication Pursuant to Rules 161(1) and 162 EPC mailed Sep. 30, 2021", 40 pgs.
"European Application Serial No. 20714985.7, Response filed Apr. 12, 2022 to Communication Pursuant to Rules 161(1) and 162 EPC mailed Oct. 5, 2021", 18 pgs.
"European Application Serial No. 20714986.5, Communication Pursuant to Article 94(3) EPC mailed Jun. 30, 2023", 7 pgs.
"European Application Serial No. 20714986.5, Response filed Apr. 12, 2022 Communication Pursuant to Rule 161(1) and 162 EPC mailed Oct. 5, 2021", 30 pgs.
"European Application Serial No. 20714988.1, Response Filed Apr. 11, 2022 to Communication pursuant to Rules 161(1) and 162 EPC Filed Oct. 5, 2021", 20 pgs.
"European Application Serial No. 21210676.9, Extended European Search Report mailed Jan. 14, 2022", 7 pgs.
"European Application Serial No. 21210676.9, Voluntary Amendment filed on Aug. 4, 2022", 11 pgs.
"European Application Serial No. 22198344.8, Extended European Search Report mailed Jan. 5, 2023", 10 pgs.
"European Application Serial No. 22198344.8, Response Filed Aug. 11, 2023 Extended European Search Report mailed Jan. 5, 2023", No Claim Amendments, 8 pgs.
"European Application Serial No. 20714987.3, Response filed Apr. 12, 2022 to Communication Pursuant to Rules 161(1) and 162 EPC mailed Oct. 5, 2021", 78 pgs.
"Google: core/java/android/companion/BluetoothLeDeviceFilter. java-platform/frameworks/base—Git at Google", Android Core Code, Bluetooth Companion, [Online] Retrieved from the Internet: <https://android.googlesource.com/platform/frameworks/base/+/master/core/java/android/companion/BluetoothLeDeviceFilter.java>, (Jan. 1, 2017), 9 pgs
"Indian Application Serial No. 202117019181, First Examination Report mailed Feb. 22, 2022", with English translation, 9 pages.
"Indian Application Serial No. 202117019181, Response filed Aug. 22, 2022 to First Examination Report mailed Feb. 22, 2022", with English claims, 22 pages.
"Indian Application Serial No. 202117041276, First Examination Report mailed Aug. 29, 2022", with English translation, 5 pages.
"Indian Application Serial No. 202117041276, Response Filed Feb. 28, 2023 to First Examination Report mailed Aug. 29, 22", with English claims, 19 pages.
"Indian Application Serial No. 202117041409, First Examination Report mailed Sep. 7, 2022", with English translation, 6 pages.
"Indian Application Serial No. 202117041409, Response Filed Mar. 7, 2023 to First Examination Report mailed Sep. 7, 2022", with English claims, 17 pages.
"Indian Application Serial No. 202117041409; Voluntary Amendment Filed Mar. 7, 2023", with English claims, 11 pages.
"Indian Application Serial No. 202117041414, First Examination Report mailed Sep. 5, 2022", with English translation, 6 pages.
"Indian Application Serial No. 202117041414, Response Filed Mar. 3, 2023 to First Examination Report mailed Sep. 5, 2022", with English claims, 23 pages.
"Indian Application Serial No. 202117041414, Voluntary Amendment Filed Mar. 3, 2023", with English claims, 11 pages.
"Indian Application Serial No. 202117041712, First Examination Report mailed Sep. 8, 2022", with English translation, 5 pages.
"Indian Application Serial No. 202117041712, Response Filed Mar. 7, 2023 to First Examination Report mailed Sep. 8, 2022", with English claims, 16 pages.
"Indian Application Serial No. 202117041714, First Examination Report mailed Sep. 7, 2022", with English translation, 8 pages.

(56) References Cited

OTHER PUBLICATIONS

"Indian Application Serial No. 202117041714, Response Filed Mar. 7, 2023 to First Examination Report mailed Sep. 7, 2022", with English claims, 17 pages.
"Indian Application Serial No. 202117041715, First Examination Report mailed Mar. 15, 2022", with English translation, 8 pages.
"Indian Application Serial No. 202117041715, Response Filed Sep. 9, 2022 to First Examination Report mailed Mar. 15, 2022", with English claims, 9 pages.
"Indian Application Serial No. 202117041715, Voluntary Amendment Filed Sep. 15, 2022", with English claims, 70 pages.
"Indian Application Serial No. 202117042210, First Examination Report mailed Mar. 17, 2022", with English translation, 5 pages.
"Indian Application Serial No. 202117042210, Response Filed Sep. 16, 2022 to First Examination Report mailed Mar. 17, 2022", with English claims, 11 pages.
"Indian Application Serial No. 202117042210, Voluntary Amendment Filed Sep. 15, 2022", with English claims, 12 pages.
"International Application Serial No. PCT/EP2019/080113, International Preliminary Report on Patentability mailed May 14, 2021", 7 pgs.
"International Application Serial No. PCT/EP2019/080113, International Search Report mailed Feb. 7, 2020", 4 pgs.
"International Application Serial No. PCT/EP2019/080113, Written Opinion mailed Feb. 7, 2020", 5 pgs.
"International Application Serial No. PCT/EP2020/058197, International Preliminary Report on Patentability mailed Oct. 7, 2021", 10 pgs.
"International Application Serial No. PCT/EP2020/058197, International Search Report mailed Jul. 28, 2020", 5 pgs.
"International Application Serial No. PCT/EP2020/058197, Written Opinion mailed Jul. 28, 2020", 8 pgs.
"International Application Serial No. PCT/EP2020/058199, International Preliminary Report on Patentability mailed Sep. 28, 2021", 8 pgs.
"International Application Serial No. PCT/EP2020/058199, International Search Report mailed Jun. 8, 2020", 5 pgs.
"International Application Serial No. PCT/EP2020/058199, Written Opinion mailed Jun. 8, 2020", 7 pgs.
"International Application Serial No. PCT/EP2020/058201, International Preliminary Report on Patentability mailed Oct. 7, 2021", 10 pgs.
"International Application Serial No. PCT/EP2020/058201, International Search Report mailed Jun. 26, 2020", 5 pgs.
"International Application Serial No. PCT/EP2020/058201, Written Opinion mailed Jun. 26, 2020", 8 pgs.
"International Application Serial No. PCT/EP2020/058210, International Preliminary Report on Patentability mailed Oct. 7, 2021", 15 pgs.
"International Application Serial No. PCT/EP2020/058210, International Search Report mailed Jun. 29, 2020", 4 pgs.
"International Application Serial No. PCT/EP2020/058210, Written Opinion mailed Jun. 29, 2020", 13 pgs.
"International Application Serial No. PCT/EP2020/058216, International Preliminary Report on Patentability mailed Sep. 28, 2021", 9 pgs.
"International Application Serial No. PCT/EP2020/058216, International Search Report mailed Jun. 26, 2020", 5 pgs.
"International Application Serial No. PCT/EP2020/058216, Written Opinion mailed Jun. 26, 2020", 8 pgs.
"International Application Serial No. PCT/EP2020/058218, International Preliminary Report on Patentability mailed Sep. 28, 2021", 7 pgs.
"International Application Serial No. PCT/EP2020/058218, International Search Report mailed Jun. 15, 2020", 5 pgs.
"International Application Serial No. PCT/EP2020/058218, Written Opinion mailed Jun. 15, 2020", 6 pgs.
"International Application Serial No. PCT/EP2020/058221, International Preliminary Report on Patentability mailed Oct. 7, 2021", 12 pgs.
"International Application Serial No. PCT/EP2020/058221, International Search Report mailed Jun. 29, 2020", 5 pgs.
"International Application Serial No. PCT/EP2020/058221, Written Opinion mailed Jun. 29, 2020", 10 pgs.
"Japanese Application Serial No. 2021-523189, Notification of Reasons for Refusal mailed Jul. 12, 2022", with English translation, 14 pages.
"Japanese Application Serial No. 2021-523189, Response Filed Oct. 5, 2022 to Notification of Reasons for Refusal mailed Jul. 12, 2022", with English claims, 21 pages.
"Japanese Application Serial No. 2021-557174, Notification of Reasons for Refusal mailed Apr. 18, 2023", with English translation, 10 pages.
"Japanese Application Serial No. 2021-557174, Notification of Reasons for Refusal mailed Nov. 1, 2022", with English translation, 8 pages.
"Japanese Application Serial No. 2021-557174, Response Filed Jan. 18, 2023 to Notification of Reasons for Refusal mailed Nov. 1, 2022", with English claims, 17 pages.
"Japanese Application Serial No. 2021-557174, Response Filed Jul. 12, 2023 to Notification of Reasons for Refusal mailed Apr. 18, 2023", with English claims, 11 pages.
"Japanese Application Serial No. 2021-557175, Notification of Reasons for Refusal mailed Sep. 27, 2022", with English translation, 6 pages.
"Japanese Application Serial No. 2021-557175, Response Filed Dec. 19, 2022 to Notification of Reasons for Refusal mailed Sep. 27, 2022", with English claims, 16 pages.
"Japanese Application Serial No. 2021-557176, Notification of Reasons for Refusal mailed Nov. 1, 2022", with English translation, 12 pages.
"Japanese Application Serial No. 2021-557176, Response Filed Jan. 18, 2023 to Notification of Reasons for Refusal mailed Nov. 1, 2022", with English claims, 15 pages.
"Japanese Application Serial No. 2021-557177, Notification of Reasons for Refusal mailed Sep. 27, 2022", with English translation, 18 pages.
"Japanese Application Serial No. 2021-557177, Response Filed Dec. 16, 2022 to Notification of Reasons for Refusal mailed Sep. 27, 2022", with English claims, 16 pages.
"Japanese Application Serial No. 2021-557178, Final Notification of Reasons for Refusal mailed May 9, 2023", with English translation, 4 pages.
"Japanese Application Serial No. 2021-557178, Notification of Reasons for Refusal mailed Oct. 18, 2022", with English translation, 9 pages.
"Japanese Application Serial No. 2021-557178, Request Filed Jan. 13, 2023 to Notification of Reasons for Refusal mailed Oct. 18, 2022", with English claims, 16 pages.
"Japanese Application Serial No. 2021-557178, Response Filed Aug. 4, 2023 to Final Notification of Reasons for Refusal mailed May 9, 2023", with English claims, 10 pages.
"Japanese Application Serial No. 2021-557179, Notification of Reasons for Refusal mailed Oct. 18, 2022", with English translation, 10 pages.
"Japanese Application Serial No. 2021-557179, Notification of Reasons for Rejection mailed May 9, 2023", with English translation, 6 pages.
"Japanese Application Serial No. 2021-557179, Response Filed Jan. 13, 2023 to Notification of Reasons for Refusal mailed Oct. 18, 2022", with English claims, 18 pages.
"Japanese Application Serial No. 2021-557179, Response Filed Aug. 4, 2023 to Notification of Reasons for Rejection mailed May 9, 2023", with English claims, 9 pages.
"Japanese Application Serial No. 2021-557180, Final Notification of Reasons for Refusal mailed Apr. 18, 2023", with English translation, 8 pages.
"Japanese Application Serial No. 2021-557180, Notification of Reasons for Refusal mailed Nov. 1, 2022", with English translation, 10 pages.
"Japanese Application Serial No. 2021-557180, Response Filed Jan. 18, 2023 to Notification of Reasons for Refusal mailed Nov. 1, 2022", with English claims, 19 pages.

(56) References Cited

OTHER PUBLICATIONS

"Japanese Application Serial No. 2021-557180, Response Filed Jul. 14, 2023 to Final Notification of Reasons for Refusal mailed Apr. 18, 2023", with English claims, 10 pages.

"Japanese Application Serial No. 2023-005052, Notification of Reasons for Refusal mailed Oct. 17, 2023", with English translation, 16 pages.

"Korean Application Serial No. 10-2021-7013164, Notice of Preliminary Rejection mailed Mar. 31, 2023", with English translation, 13 pages.

"Korean Application Serial No. 10-2021-7013164, Response Filed May 30, 2023 to Notice of Preliminary Rejection mailed Mar. 31, 2023", with English claims, 35 pages.

"Korean Application Serial No. 10-2021-7030699, Notice of Preliminary Rejection mailed Jul. 28, 2023", with English translation, 11 pages.

"Korean Application Serial No. 10-2021-7030765, Notice of Preliminary Rejection mailed Jul. 28, 2023", with English translation, 16 pages.

"Korean Application Serial No. 10-2021-7030781, Notice of Preliminary Rejection mailed Jul. 20, 2023", with English translation, 11 pages.

"Korean Application Serial No. 10-2021-7030785, Notice of Preliminary Rejection mailed Jul. 28, 2023", with English translation, 11 pages.

Angelico, Bruno, "Ultra-wideband Performance in a Dense Multipath Environment with Time and Spatial Diversity", 16th IST Mobile and Wireless Communications Summit, [Online]. Retrieved from the Internet: <https://ieeexplore.ieee.org/stamp/stamp.jsp?tp=&arnumber=4299254>, (2007), 5 pgs.

Canadeo, C. M, et al., "Code selection for enhancing UWB multiple access communication performance using TH-PPM and DS-BPSK modulations", 2003 IEEE Wireless Communications and Networking, WCNC 2003, [Online] Retrieved from the internet: <https://ieeexplore.ieee.org/stamp/stamp.jsp?tp=&arnumber=1200432> (Year: 2003), (2003), 678-682.

Drutarovsky, Milos, et al., "Real-Time Wireless UWB Sensor Network for Person Monitoring", 2017 14th International Conference on Telecommunications (ConTEL), [Online] Retrieved from the internet:<https://ieeexplore.ieee.org/stamp/stamp.jsp?tp=&arnumber=8000034>, (2017), 19-26.

Hu, Sanming, et al., "Measurements of UWB Antennas Backscattering Characteristics for RFID Systems", 2007 IEEE International Conference on Ultra-Wideband, [Online] Retrieved from the internet:<https://ieeexplore.ieee.org/stamp/stamp.jsp?tp=&arnumber=4380922>, (2007), 94-99.

Huang, Jingjing, et al., "Secret Key Generation Exploiting Ultra-wideband Indoor Wireless Channel Characteristics", IEEE Military Communications Conference, [Online]. Retrieved from the Internet:<https://ieeexplore.ieee.org/stamp/stamp.jsp?tp=&arnumber=6735631>, (2013), 5 pgs.

Madiseh, Ghoreishi M, "Verification of Secret Key Generation from UWB Channel Observations", IEEE International Conference on Communications, [Online]. Retrieved from the Internet:<https://ieeexplore.ieee.org/stamp/stamp.jsp?tp=&arnumber=5199564>, (2009), 5 pgs.

Miri, Jamel, "Privacy group distance bounding protocol on TH-UWB based NTRU public key cryptosystem", Sixth International Conference on Communications and Networking, [Online]. Retrieved from the Internet:<https://ieeexplore.ieee.org/stamp/stamp.jsp?tp=&arnumber=8285598>, (2017), 7 pgs.

Ranganathan, Aanjhan, et al., "Are We Really Close? Verifying Proximity in Wireless Systems", in IEEE Security & Privacy, vol. 15, No. 3, (May/Jun. 2017), 7 pgs.

Rousselot, Jerome, et al., "WideMac: a low power and routing friendly MAC protocol for Ultra Wideband sensor networks", IEEE International Conference on Ultra-Wideband, [Online]. Retrieved from the Internet:<https://ieeexplore.ieee.org/stamp/stamp.jsp?tp=&arnumber=4653427>, (2008), 4 pgs.

Somayazulu, V S, "Multiple access performance in UWB systems using time hopping vs. direct sequence spreading", IEEE Wireless Communications and Networking Conference Record, [Online]. Retrieved from the Internet: <https://ieeexplore.ieee.org/stamp/stamp.jsp?tp=&arnumber=993322>, (2002), 4 pgs.

"Mexican Application Serial No. MX a 2021 011639, Response filed Oct. 31, 2024 to Office Action mailed Aug. 12, 2024", with English claims, 25 pages.

"Mexican Application Serial No. MX a 2021 011640, Response filed Oct. 31, 2024 to Office Action mailed Aug. 12, 2024", with English claims, 18 pages.

"European Application Serial No. 20714988.1, Response Filed Oct. 29, 2024 to Communication Pursuant to Article 94(3) EPC mailed Jul. 11, 2024", 24 pgs.

"Japanese Application Serial No. 2023-019246, Response filed Oct. 28, 2024 to Notification of Reasons for Refusal mailed Aug. 6, 2024", with English claims, 16 pages.

"Australian Application Serial No. 2024201350, First Examination Report mailed Oct. 9, 2024", 2 pgs.

"European Application Serial No. 23210850.6, Response filed Oct. 31, 2024 to Extended European Search Report mailed Apr. 3, 2024", 16 pgs.

"European Application Serial No. 19801788.1, Communication Pursuant to Article 94(3) EPC mailed Nov. 13, 2024", 6 pgs.

"Australian Application Serial No. 2023237081, First Examination Report mailed Oct. 22, 2024", 2 pgs.

"European Application Serial No. 20714545.9, Response filed Nov. 8, 2024 to Communication Pursuant to Article 94(3) EPC mailed Jul. 11, 2024", 15 pgs.

READER COORDINATION FOR ACCESS CONTROL

CROSS-REFERENCE TO RELATED APPLICATION(S)

This application is a continuation of U.S. patent application Ser. No. 17/593,336, titled "Reader Coordination for Access Control," filed Sep. 15, 2021, which is a national stage application under 35 U.S.C. § 371 of PCT Appl. No. PCT/EP2020/058199, titled "Reader Coordination for Access Control," filed Mar. 24, 2020, which claims priority to U.S. Prov. Pat. Appl. No. 62/823,341, titled "Physical Access Control Systems with Localization-Based Intent Detection," filed Mar. 25, 2019, each of which is hereby incorporated by reference herein in its entirety.

TECHNICAL FIELD

This document pertains generally, but not by way of limitation, to access control systems, and particularly but not by way of limitation to coordination of readers in access control systems that utilize ultra-wide band (UWB) technology.

BACKGROUND

Ultra-wide band (UWB) is a radio frequency (RF) technique that uses short, low power, pulses over a wide frequency spectrum. The pulses are on the order of millions of individual pulses per second. The width of the frequency spectrum is generally greater than 500 megahertz or twenty percent of an arithmetic center frequency.

UWB can be used for communication by encoding data via time modulation (e.g., pulse-position encoding). Here, symbols are specified by pulses on a subset of time units out of a set of available time units. Other examples of UWB encodings can include amplitude modulation and polarity modulation. The wide band transmission tends to be more robust to multipath fading than carrier-based transmission techniques. Further, the lower power of pulses at any given frequency tend to reduce interference with carrier-based communication techniques.

UWB can be used in radar operations, providing localization accuracies on the scale of tens of centimeters. Due to the possibly variable absorption and reflection of different frequencies in a pulse, both surface and obstructed (e.g., covered) features of an object can be detected. In some cases, the localization provides an angle of incidence in addition to distance.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods are disclosed herein for coordinating readers in an access control system. A user carrying a credential device may approach one or more readers of the access control system. The readers may be associated with respective facilities (such as a door) used to control access to respective secure areas or resources. Upon the credential device coming into a threshold range of one of the readers, a credential may be exchanged using a low energy wireless protocol, such as Bluetooth Low Energy (BLE), for example. The reader may then establish a secret, such as a scrambled time stamp (STS), with the credential device to facilitate secure ranging using ultra-wide band (UWB) communication.

The reader may share the secret with one or more other readers of the access control system such that the other readers may also perform UWB ranging for the credential device either together with, or in place of, the initial reader. This may be advantageous to provide more robust ranging or to perform load balancing for a system that sees a lot of traffic. The ranging by the readers can be used to identify intent information for the user to determine if an intent trigger has been met, such as that the user has moved within a threshold distance of an associated facility of one of the readers, such as a door or a turnstile, for example.

Figure 1:
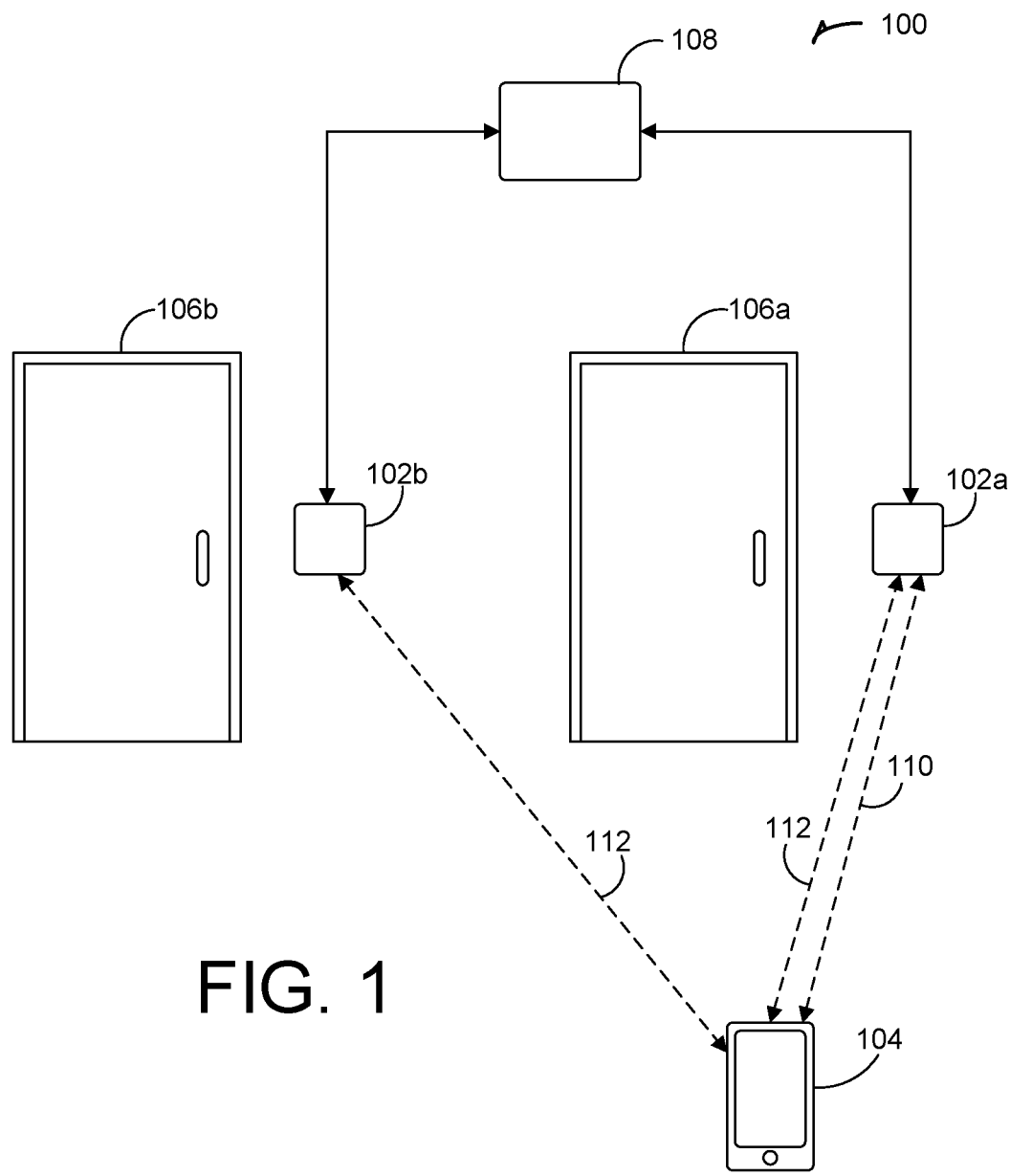
FIG. 1 is a diagram illustrating a physical access control system that includes ultra-wide band (UWB) technology.

FIG. 1 is a diagram illustrating an access control system 100 that includes readers 102a and 102b each configured to communicate with a credential device 104. While illustrated as two readers 102a and 102b, any number of readers may be included in the system 100. The reader 102a may be configured to provide access to a secured area through a door 106a and the reader 102b may be configured to provide access to a secured area through a door 106b. While illustrated as doors 106a and 106b, the readers 102a and 102b may be utilized to provide access to any resource through any facility, including turnstiles, gates, and the like. The credential device 104 is illustrated as a mobile phone but may be any other device capable of storing and providing a credential, such as a radio frequency identification (RFID) chip in a card, a fob, or other personal electronic device.

The access control system 100 illustrated in FIG. 1 is a physical access control system (PACS). Physical access control covers a range of systems and methods to govern access, for example by people, to secure areas. Physical access control includes identification of authorized users or devices (e.g., vehicles, drones, etc.) and actuation of a gate, door, or other facility used to secure an area. Readers 102a and 102b may be online or offline, hold authorization data, and be capable of determining whether credentials are authorized for an actuator (e.g., door lock, door opener, turning off an alarm, etc.) of the door 106a or 106b, or PACS include a host server to which readers 102a and 102b and actuators (e.g., via a controller 108) are connected in a centrally managed configuration. In centrally managed configurations, readers 102a and 102b can obtain credentials from the credential device 104 and pass those credentials to the PACS host server via the controller 108. The host server may then determine whether the credentials authorize access to the secure area and commands the actuator of the respective door 106a and 106b accordingly.

Wireless PACS have generally used either near field communications (NFC) such as radio frequency identification (RFID), or personal area network (PAN) technologies, such as the IEEE 802.15.1, BLE, etc. In an example, a first transmission or exchange (illustrated by dashed line 110) via one of these communication protocols with longer range capabilities, or in some cases with less accuracy (e.g., BLE, Wi-Fi, or other) can be used to provide a credential from the credential device 104 to a reader 102a. BLE devices have a range of tens of meters (e.g., ten to twenty meters). Thus, credential exchange can be accomplished as the user approaches the reader 102a or 102b. PAN standards do not, however, offer accurate physical tracking of devices (e.g., ranging, positioning, etc.). Thus, it can be difficult for the reader to determine whether the user actually intends to gain access to the secure area without some additional evidence of intent.

To address these issues, localization techniques (e.g., using secure UWB ranging) can be combined with PAN discovery and key exchange. Here, the credential device 104 and the reader 102a or 102b coordinate secure ranging using a PAN technology. This includes the reader 102a or 102b providing a secret (e.g., a scrambled time stamp (STS)) that may be used to mark ranging messages to prevent spoofing. The credential device 104 will also provide the credentials during the same PAN session in which the secret was shared. The reader 102a or 102b can decrypt or otherwise prepare the credentials as it would normally do except that the credentials are cached until an intent trigger occurs.

Thus, once the credential has been exchanged using BLE, for example, UWB communication may be employed for ranging the credential device 104 for detection of the intent trigger. For example, the reader 102a or 102b may use UWB to physically locate the credential device 104. In some examples, the UWB is activated after the secret is shared to conserve energy, which can be useful for battery powered readers or credential devices. The physical location of UWB can be more accurate than some conventional techniques and can be accurate to the tens of centimeters, providing both range and direction to the reader. This accuracy far surpasses the roughly ten-meter accuracy of PAN when readers are not coordinated. The precision of UWB accuracy can provide a useful ingredient to user intent determinations. For example, several zones can be defined, such as near the reader, at the reader, etc., to provide different contexts for understanding user intent. Moreover, the accuracy of the tracking enables an accurate model of user motion from which intent can be discerned. Thus, the reader can categorize user motion as likely approaching the reader, or simply walking past.

Once the intent of the user of the credential device 104 is identified, the reader 102a or 102b can then release the credential (sometimes referred to as PACS bits) for processing, such as sending the credential to the controller 108 to determine the access permissions for the user of the credential device 104, or to directly unlock the respective door 106a or 106b (e.g., in an offline reader). This two-step authentication sequence may reduce computational time that can lead to delays in a door opening for a user (which can be referred to as latency). That is, by this approach, the authentication and communication between the reader 102a or 102b and the credential device 104 is effectively already performed by the time the system 100 has determined that the user of the credential device 104 intends to enter the respective door 106a or 106b and the user of the credential device 104 reaches the respective door 106a or 106b.

In some examples, if the intent trigger does not occur within a time-period, or an anti-intent trigger occurs-such as moving away from the reader—the cached credentials may be cleared. This can be useful as many credentials can be cached in a reader 102a or 102b, but potentially on a smaller subset of those can be used in an authentication process (e.g., based on later predicted intent). In some examples, if the reader 102a or 102b has knowledge of whether or not the credentials provide access to the secured area—as can be the case with offline readers—the credentials are not cached if they do not provide access to the secured area. Also, in this example, UWB location is not activated.

In some examples, credential caching or UWB ranging systems or components can be packaged in an "add-on" housing and connected to an existing reader via an extension bus. Such add-on components can include a secure element to securely store cached credentials and one or more UWB front ends to facilitate UWB communication for the readers 102a and 102b. This retrofit add-on type device can increase the reader's capabilities without replacement.

To obtain more robust intent information, both readers 102a and 102b may employ UWB ranging together to identify an intent of the user of the credential device 104. For example, multiple readers 102a and 102b may employ UWB ranging to more accurately identify a direction, speed, or other intent information for ascertaining an intent of the user. When using secure UWB localization, in order to effectively function in the system, each reader 102a and 102b needs to have the secret being used for the secure ranging. Thus, in some examples, the readers 102a and 102b may be connected (e.g., via BLE, a mesh network, etc.) to share the secret. This reduces the need for exchanging the secret between each reader 102a and 102b and each credential device 104. In some examples, this exchange can also exchange the cached PACS IDs to all readers 102a and 102b, e.g., from the initial reader 102a to which the credential device 104 connected. By doing so, only one credential and secret exchange is typically needed for each credential device 104, regardless of how many readers are utilized to perform ranging.

A coordinated PACS, for example, can use the controller 108 to coordinate readers 102a and 102b, whether it is centrally managed or offline. That is, the readers 102a and 102b can operate as remote radio heads to the controller 108, with the controller 108 performing the credential caching, intent determination, and credential forwarding to a host server or commanding an actuator to operate, for example. A coordinated PACS facilitates UWB positioning of credential device 104 with one or more of the connected readers 102a and 102b. In some examples, the controller 108 can load balance UWB localization responsibilities. This can be helpful in dense credential device scenarios, such as at ticketing speed-gates.

Once the secret has been shared, one or both readers 102a and 102b may perform UWB ranging (illustrated by dashed lines 112) to determine whether to release the credential and provide access through a respective door 106a or 106b. This may be done by determining an intent of the user of the credential device 104, for example. In some examples, if UWB ranges the credential device 104 close enough (some meters) to one of the readers 102a or 102b or other target (e.g., center of one of the doors 106a or 106b), the respective reader 102a or 102b may transmit the cached PACS ID to a host server, for example, which can trigger opening of the respective door 106a or 106b. The readers 102a and 102b may then delete the cached PACS ID.

In another example, system 100 may be configured such that reader 102b may experience a much lower load than the reader 102a. For example, the door 106b may be accessed many fewer times on average than the door 106a. Therefore, it may be advantageous to hand off ranging to the reader 102b for determination of intent information for a user, even if the user is closer to the reader 102a and more likely to access the door 106a. Once the credential device 104 is in range of the reader 102a for low energy communication (such as BLE), the credential can be exchanged and the reader 102a (or controller 108) can hand off UWB ranging and/or intent determination to the reader 102b by sharing the established secret and/or credential information with the reader 102b.

Figure 2:
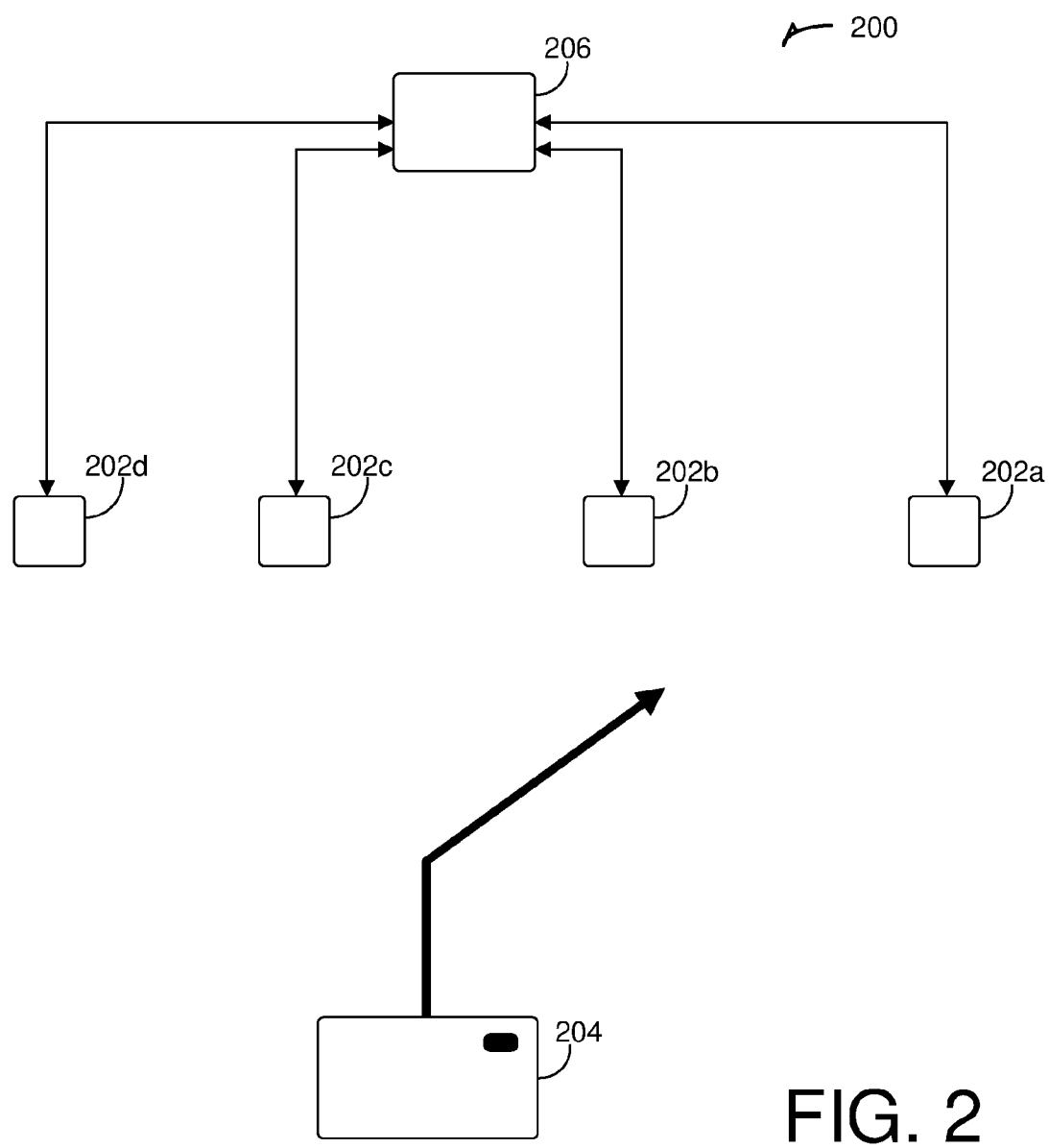
FIG. 2 is a diagram illustrating an access control system that includes several readers each configured to perform UWB ranging for a credential device.

FIG. 2 is a diagram illustrating an access control system 200 that includes readers 202a-202d configured to communicate with a credential device 204. While illustrated as four readers 202a-202d, the system 200 may include any number of readers. While illustrated as a smart card, the credential device 204 can be any credential device including a fob, mobile phone, or other personal computing device. As described above with respect to the system 100, the readers 202a-202d may be configured to provide ranging for the credential device 204. For example, reader 202b may initially exchange the credential with the credential device 204 and establish a secret using BLE or other low energy wireless protocol, for example. The secret and the credential information may then be shared with the readers 202a-202d to facilitate ranging of the credential device 204 by the readers 202a-202d. For example, the readers 202a-202d may be equipped with one or more antennae and transceivers configured to transmit and receive UWB signals to perform ranging of the credential device 204.

The ranging performed by the readers 202a-202d may be used to identify intent information for the user of the credential device 204 to detect an intent trigger. This may be accomplished by providing the ranging data to a controller 206, for example, or other centralized computing system. In another example, there may not be a controller 206 and the readers 202a-202d may communicate directly with one another. In this example, one or more of the readers 202a-202d may receive the intent information and identify intent triggers for the user of the credential device 204.

To conserve power, it may be advantageous to terminate ranging for readers 204a-204d for which intent information has indicated that the user of the credential device 204 is unlikely to approach. For example, a path 208 of the user may be identified using ranging by the readers 202a-202d. As illustrated in FIG. 2, the user turns right and heads toward readers 202a and 202b. Upon detecting this change in direction from the intent information, the system 200 may decide to stop performing ranging using readers 202c and/or 202d. As the user moves toward the reader 202a, the readers 202a and 202b may assume sole responsibility for ranging to conserve energy for the readers 202c and 202d.

Figure 3:
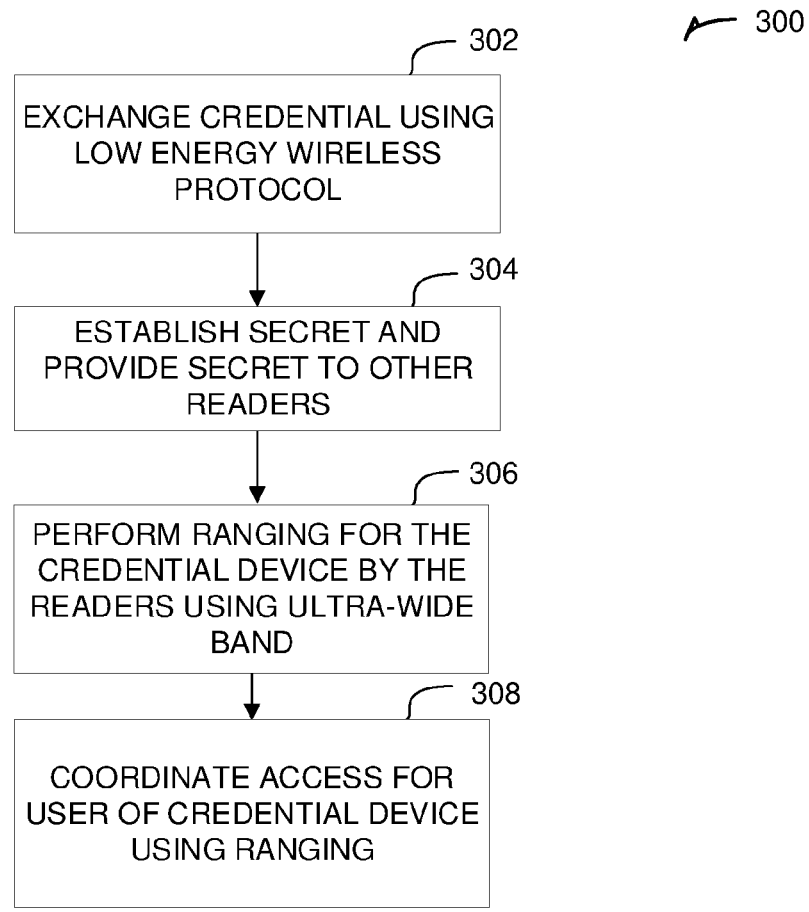
FIG. 3 is a flowchart illustrating a method of providing access control by coordinating readers.

FIG. 3 is a flowchart illustrating a method 300 of providing access using multiple readers in an access control system. At step 302, a credential device has moved into range of a reader of the access control system. This may be a range capable of transmitting a credential using a low energy wireless protocol, such as BLE. The credential is exchanged using the low energy wireless protocol. At step 304, upon receiving the credential, a secret is established with the credential device. This may be a scrambled time stamp (STS) or other generated secret. This may also be exchanged using the low energy wireless protocol. The secret is then shared by the initial reader with other nearby readers of the access control system. This may be communicated through a system controller or may be directly communicated to the nearby readers from the initial reader. The initial reader may also share the credential or other information (such as a PACS ID) with the other nearby readers. This way, only one exchange is needed between the readers and the credential device.

At step 306, ranging is performed by the readers using the shared secret. This may be performed by each reader using UWB messages marked with the shared secret, for example. By using multiple readers to range the credential device, intent information for a user of the credential device may be better determined. For example, distance to each reader, direction of travel, speed of travel, and other intent information may be identified for a user of the credential device to identify if the user is approaching, or has arrived at, any facility controlled by a respective one of the readers.

At step 308, access is coordinated to a secured area or other resource protected by the respective facilities controlled by the readers. For example, upon a user of the credential device coming within a certain range of a door controlled by a respective reader, a lock for the door may be actuated to provide the user access through the door. In some examples, a timeout may be implemented such that if a user has not come within range of the controlled facility, or the user intent indicates the user is moving away from the controlled facility, the credential and shared secret may be cleared from a cache of the respective reader.

Figure 4:
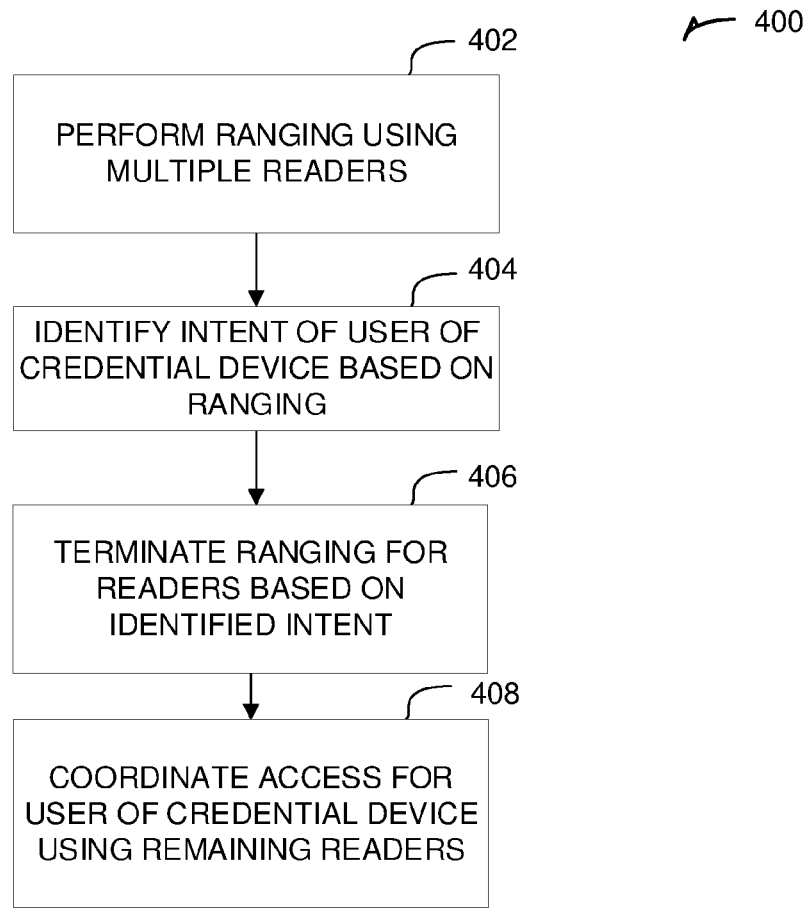
FIG. 4 is a flowchart illustrating a method of coordinating ranging by several readers based on an identified intent of a user of a credential device.

FIG. 4 is a flowchart illustrating a method 400 of coordinating readers in an access control system. At step 402, multiple readers in an access control system are ranging a credential device. Step 402 may be arrived at by using the methods describe in FIG. 3, for example, or using any other method. At step 404, intent information for the user of the credential device is identified. This may be accomplished using the ranging data identified by the multiple readers. For example, a direction of the user, a speed of the user, or any other intent information may be ascertained.

At step 406, ranging can be terminated for respective readers based on the identified intent information of the user. For example, if the user turns and heads toward one or more of the readers, while heading away from one or more of the readers, the readers for which the user is heading away may have ranging terminated. In this example, the cached secret and cached identifier can be removed from the readers that are terminating ranging. This may save on power consumption for readers for which the user is unlikely to approach. At step 408, the remainder of the readers coordinate access to the secured area or other resources that may be accessed by the user.

Figure 5:
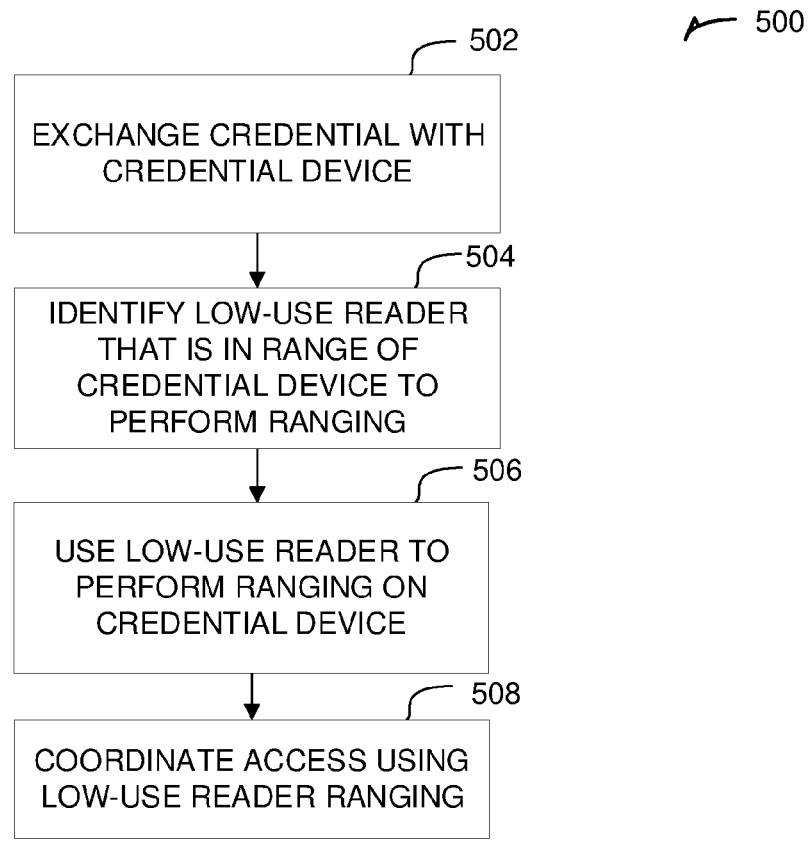
FIG. 5 is a flowchart illustrating a method of handing off performance of UWB ranging to a lower-use reader in an access control system.

FIG. 5 is a flowchart illustrating a method 500 of handing off ranging duties between readers in an access control system. At step 502, a credential device has moved into range of a reader of the access control system. This may be a range capable of transmitting a credential using a low energy wireless protocol, such as BLE. The credential is exchanged using the low energy wireless protocol. Upon receiving the credential, a secret is established with the credential device. This may be a scrambled time stamp (STS) or other secret. This may also be exchanged using the low energy wireless protocol.

At step 504, the system may determine that a reader within range to perform ranging for the credential device is a low-use reader. Thus, the secret may be shared by the initial reader with the low-use reader to hand off ranging duties. This may be communicated through a system controller or may be directly communicated to the low-use reader. In another example, the other reader may not be a low-use reader, but the initial reader is experiencing particularly heavy traffic and may offload ranging duties to another reader that is not currently experiencing the same heavy traffic. This may be determined by the reader itself, by a system controller, or in any other way. The initial reader may also share the credential or other information (such as a PACS ID) with the low-use reader.

At step 506, the low-use reader is used to perform ranging using the shared secret for the credential device. The ranging may be utilized to identify an intent of a user of the credential device. For example, the low-use reader may perform ranging to identify a direction, speed, or other property of movement for the user. At step 508, access to one or more controlled areas or other resources may be coordinated based on the intent identified by the ranging performed by the low-use reader. For example, the ranging performed by the low-use reader may identify that a user is within a threshold range of a facility controlled by the initial reader, and the facility may be controlled to provide the user access to the respective controlled area or resource. This way, load balancing can be performed for systems in which there are several readers capable of performing ranging for a common credential device such as, for example, turnstile systems.

Figure 6:
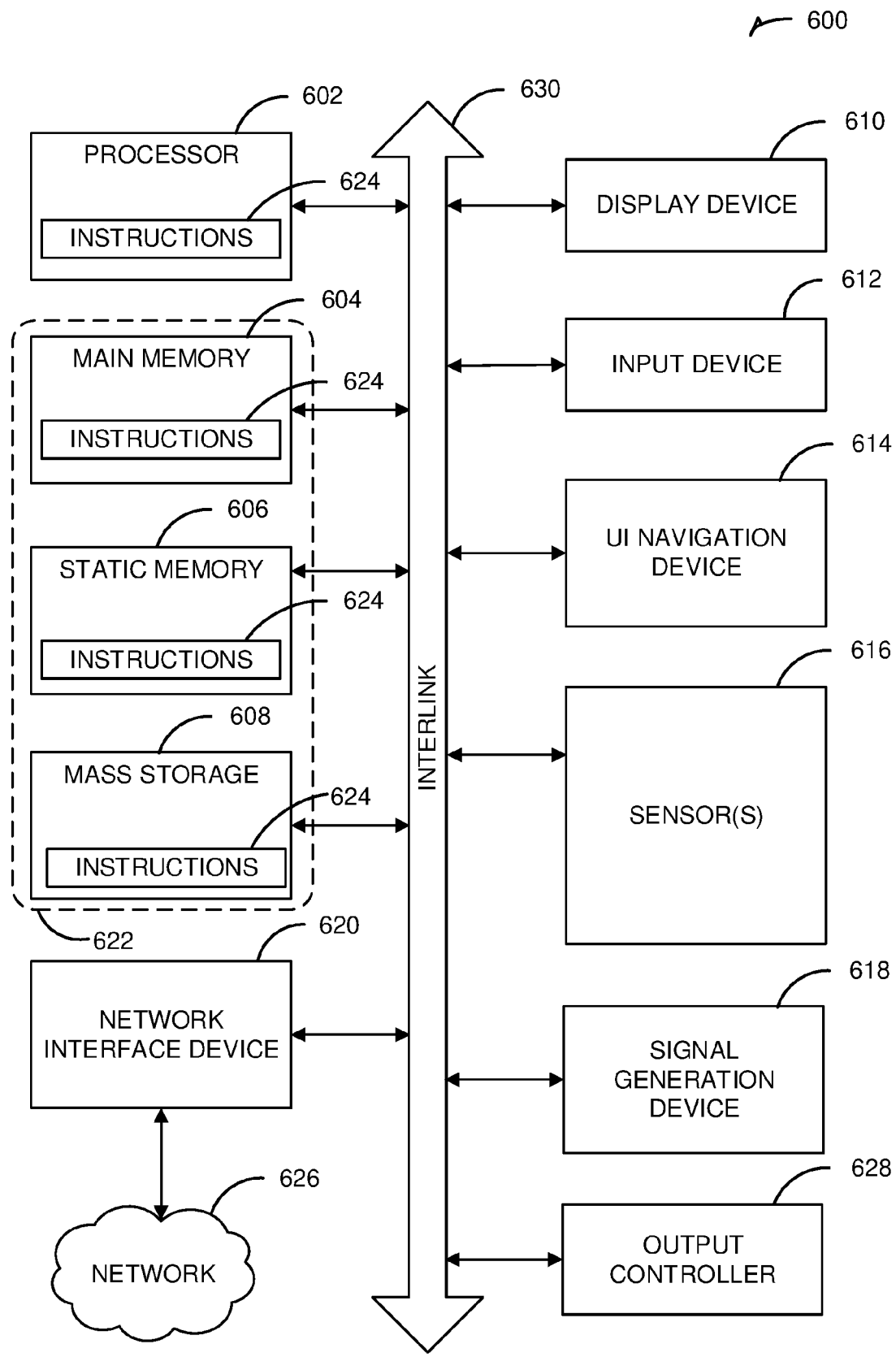
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein can perform. Examples, as described herein, can include, or can operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership can be flexible over time. Circuitries include members that can, alone or in combination, perform specified operations when operating. In some examples, hardware of the circuitry can be immutably designed to carry out a specific operation (e.g., hardwired). In some examples, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in some examples, the machine readable medium elements are part of the circuitry or are communicatively coupled to the other components of the circuitry when the device is operating. In some examples, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 600 follow.

In some embodiments, the machine 600 can operate as a standalone device or can be connected (e.g., networked) to other machines. In a networked deployment, the machine 600 can operate in the capacity of a server machine, a client machine, or both in server-client network environments. In some examples, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 can include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which can communicate with each other via an interlink (e.g., bus) 630. The machine 600 can further include a display unit 610, an alphanumeric input device 612 (e.g., a keyboard), and a user interface (UI) navigation device 614 (e.g., a mouse). In some examples, the display unit 610, input device 612 and UI navigation device 614 can be a touch screen display. The machine 600 can additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 can be, or include, a machine readable medium 622 on which is stored one or more sets of data structures or instructions 624 (e.g., software) embodying or utilized by any one or more of the techniques or functions described herein. The instructions 624 can also reside, completely or at least partially, within any of registers of the processor 602, the main memory 604, the static memory 606, or the mass storage 608 during execution thereof by the machine 600. In some examples, one or any combination of the hardware processor 602, the main memory 604, the static memory 606, or the mass storage 608 can constitute the machine readable media 622. While the machine readable medium 622 is illustrated as a single medium, the term "machine readable medium" can include a single medium or multiple media (e.g., a centralized or distributed database, and/or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In some examples, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In some examples, information stored or otherwise provided on the machine readable medium 622 can be representative of the instructions 624, such as instructions 624 themselves or a format from which the instructions 624 can be derived. This format from which the instructions 624 can be derived can include source code, encoded instructions (e.g., in compressed or encrypted form), packaged instructions (e.g., split into multiple packages), or the like. The information representative of the instructions 624 in the machine readable medium 622 can be processed by processing circuitry into the instructions to implement any of the operations discussed herein. For example, deriving the instructions 624 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In some examples, the derivation of the instructions 624 can include assembly, compilation, or interpretation of the information (e.g., by the processing circuitry) to create the instructions 624 from some intermediate or preprocessed format provided by the machine readable medium 622. The information, when provided in multiple parts, can be combined, unpacked, and modified to create the instructions 624. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 can be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In some examples, the network interface device 620 can include one or more physical jacks (e.g., Ethernet, coaxial, or phone jacks) or one or more antennas to connect to the communications network 626. In some examples, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for providing access control, the method comprising:
   upon a credential device coming into a threshold range of a first reader, receiving a credential from the credential device at the first reader using a first communication protocol, wherein the first communication protocol is a low energy wireless communication protocol;
   establishing a secret among the first reader, the credential device, and at least a second reader, wherein the secret is shared with the credential device using the first communication protocol;
   identifying intent information for the credential device by performing ranging of the credential device by the first reader and the at least a second reader using the secret and a second communication protocol different than the first communication protocol, wherein the second communication protocol is ultra-wide band (UWB); and
   coordinating access through an access facility based on the intent information.

2. The method of claim 1, wherein the at least a second reader comprises a plurality of second readers.

3. The method of claim 2, wherein the at least a second reader comprises three second readers.

4. The method of claim 1, wherein the first communication protocol is Bluetooth Low Energy (BLE).

5. The method of claim 1, wherein ranging of the credential device comprises using UWB messages marked with the secret.

6. The method of claim 1, wherein identifying intent information for the credential device comprises identifying a distance of the credential device from the first reader and each second reader.

7. The method of claim 1, wherein coordinating access through the access facility based on the intent information comprises determining the credential device has moved within a threshold distance of the access facility.

8. The method of claim 1, further comprising sharing the secret with at least a third reader, wherein identifying intent information for the credential device further comprises performing ranging of the credential device by the at least a third reader using the secret and the second communication protocol.

9. The method of claim 8, further comprising terminating ranging of the credential device by the first reader and the at least a second reader.

10. The method of claim 9, wherein terminating ranging of the credential device by the first reader and the at least a second reader is done in response to determining, from the intent information, that the credential device is moving away from the first reader and the at least a second reader.

11. An access control system comprising:
    a first reader configured to receive a credential from a credential device using a first communication protocol upon the credential device coming into a threshold range of the first reader, wherein the first communication protocol is a low energy wireless communication protocol;
    at least a second reader; and
    a secret established among the first reader, the credential device, and the at least a second reader, wherein the secret is shared with the credential device using the first communication protocol;
    wherein the first reader and the at least a second reader are configured to perform ranging of the credential device using the secret and a second communication protocol different than the first communication protocol to identify intent information, wherein the second communication protocol is ultra-wide band (UWB),
    wherein access through an access facility is coordinated based on the intent information.

12. The system of claim 11, wherein the at least a second reader comprises a plurality of second readers, each configured to perform ranging of the credential device using the secret and the second communication protocol.

13. The system of claim 12, wherein the plurality of second readers comprises three second readers.

14. The system of claim 12, further comprising a centralized computing system to which the first reader and the plurality of second readers are connected.

15. The system of claim 14, wherein the first reader and the plurality of second readers are each configured to send ranging data to the centralized computing system.

16. The system of claim 15, wherein the centralized computing system is configured to identify the intent information from the ranging data.

17. The system of claim 11, further comprising at least a third reader configured to perform ranging of the credential device using the secret and the second communication protocol, wherein the intent information for the credential device is further based on the ranging of the credential device by the at least a third reader.

18. The system of claim 11, wherein the first reader and the at least a second reader are further configured to terminate ranging of the credential device in response to the credential device moving away from the first reader and the at least a second reader.

19. The system of claim 11, wherein the first communication protocol is Bluetooth Low Energy (BLE).

20. A non-transitory computer readable medium comprising executable program code that, when executed by at least one processor, causes the at least one processor to:
    upon a credential device coming into a threshold range of a first reader, receive a credential from the credential device at the first reader using a first communication protocol, wherein the first communication protocol is a low energy wireless communication protocol;
    establish a secret among the first reader, the credential device, and at least a second reader, wherein the secret is shared with the credential device using the first communication protocol;
    identify intent information for the credential device by performing ranging of the credential device by the first reader and the at least a second reader using the secret and a second communication protocol different than the first communication protocol, wherein the second communication protocol is ultra-wide band (UWB); and
    coordinate access through an access facility based on the intent information.

* * * * *